(12) United States Patent
Taylor et al.

(10) Patent No.: US 12,598,410 B2
(45) Date of Patent: Apr. 7, 2026

(54) MECHANICAL SLIDER FOR HEADPHONES

(71) Applicant: Sonos, Inc., Santa Barbara, CA (US)

(72) Inventors: Tristan Taylor, Boston, MA (US); Sam Prentice, Glasgow (GB); Alexia Delhoume, Boston, MA (US); Roderick George William Philip, Inverness (GB); David Keating, Glasgow (GB)

(73) Assignee: SONOS, INC., Goleta, CA (US)

( * ) Notice: Subject to any disclaimer, the term of this patent is extended or adjusted under 35 U.S.C. 154(b) by 213 days.

(21) Appl. No.: 18/540,554

(22) Filed: Dec. 14, 2023

(65) Prior Publication Data

US 2024/0205586 A1 Jun. 20, 2024

Related U.S. Application Data

(60) Provisional application No. 63/387,800, filed on Dec. 16, 2022.

(51) Int. Cl.
| | |
|---|---|
| *H04R 1/10* | (2006.01) |
| *G06F 3/01* | (2006.01) |
| *G06F 3/16* | (2006.01) |

(52) U.S. Cl.
CPC ........... *H04R 1/1041* (2013.01); *G06F 3/016* (2013.01); *G06F 3/165* (2013.01); *H04R 1/1008* (2013.01); *H04R 1/105* (2013.01)

(58) Field of Classification Search
CPC .... H04R 1/1041; H04R 1/1008; H04R 1/105; H04R 5/04; H04R 5/0335; G06F 3/165;
(Continued)

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |

(Continued)

FOREIGN PATENT DOCUMENTS

| | | |
|---|---|---|
| CN | 1725093 A | 1/2006 |
| CN | 113035628 A | 6/2021 |

(Continued)

OTHER PUBLICATIONS

AudioTron Quick Start Guide, Version 1.0, Mar. 2001, 24 pages.
(Continued)

*Primary Examiner* — David L Ton
(74) *Attorney, Agent, or Firm* — Workman Nydegger

(57) ABSTRACT

A linear-travel mechanical switch for use in a headphone device comprises a user button attached to a plunger. The plunger extends into a body of the headphone device. A travel pathway extends in a first linear direction from the plunger and in a second, opposite linear direction from the plunger. At least one bias device is integrated into the linear-travel mechanical switch. The at least one bias device biasing the plunger to a middle position along the travel pathway. A plunger button is located such that depressing the user button engages the plunger button. A first button is located such that a movement of the user button along the travel pathway in the first linear direction engages the first button. A second button is located such that a movement of the user button long the travel pathway in the second, opposite linear direction engages the second button.

20 Claims, 27 Drawing Sheets

(58) Field of Classification Search

CPC .. G06F 3/016; H01H 2025/004; H01H 15/24;
H01H 15/16

See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 9,848,258 | B1 * | 12/2017 | Roadley-Battin .... H04R 1/1016 |
| 10,560,773 | B1 | 2/2020 | Roadley-Battin et al. |
| 10,757,491 | B1 * | 8/2020 | Jackson ................... G06F 3/167 |
| 10,757,499 | B1 * | 8/2020 | Vautrin ................... G06F 3/165 |
| 10,779,074 | B1 * | 9/2020 | VanBlon .............. H04R 1/1008 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2013/0322676 | A1 | 12/2013 | Araki et al. |
| 2014/0110231 | A1 * | 4/2014 | Kibiti ..................... H01H 15/04 29/622 |
| 2016/0381452 | A1 * | 12/2016 | Rodriguez ........... H04R 1/1041 381/370 |
| 2020/0155929 | A1 | 5/2020 | Chan |
| 2022/0086557 | A1 * | 3/2022 | Bonanno ................ H04R 5/033 |
| 2023/0007382 | A1 * | 1/2023 | Hansen ................... H04R 5/033 |
| 2023/0308797 | A1 * | 9/2023 | Taylor ................. H04R 1/1041 |

FOREIGN PATENT DOCUMENTS

| | | | | |
|---|---|---|---|---|
| CN | 115804112 | A * | 3/2023 | ........... H04R 1/1066 |
| CN | 115150701 | B * | 7/2023 | ........... H04R 1/1091 |
| EP | 1389853 | A1 | 2/2004 | |
| KR | 100619892 | B1 * | 9/2006 | ............. H01H 36/00 |
| WO | 200153994 | | 7/2001 | |
| WO | 2003093950 | A2 | 11/2003 | |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

*Sonos, Inc.* v. *D&M Holdings* (No. 14-1330-RGA), DI 219, Claim Construction Opinion (Jan. 12, 2017) (24 pages).

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

International Bureau, International Preliminary Report on Patentability, mailed on Jun. 12, 2025, issued in connection with International Application No. PCT/US2023/084098, filed on Dec. 14, 2023, 9 pages.

* cited by examiner

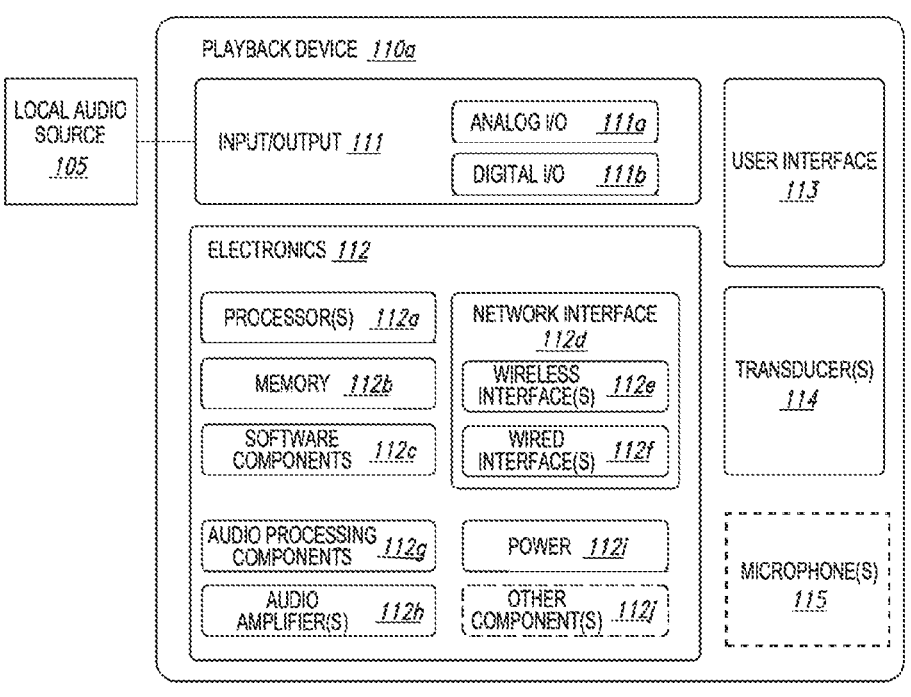
FIG. 1C
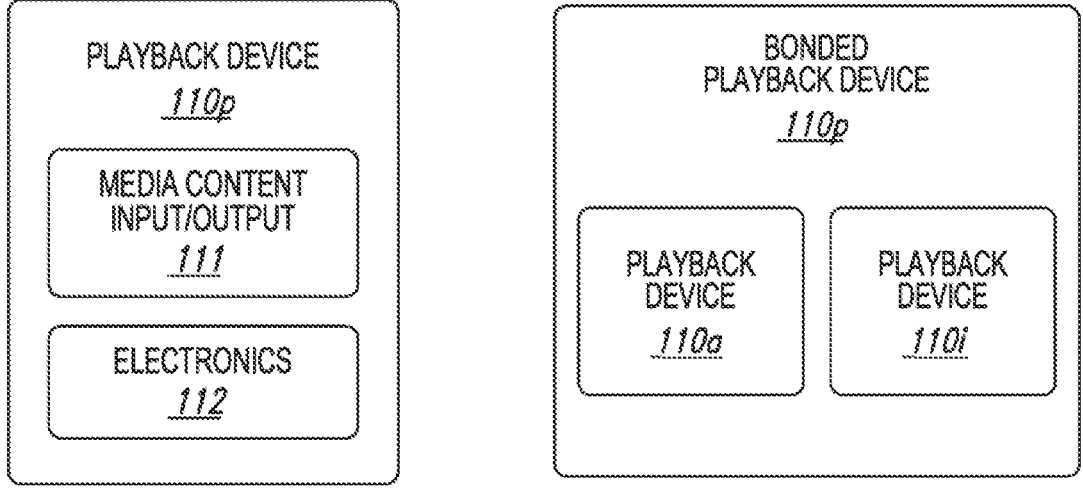
FIG. 1D                    FIG. 1E

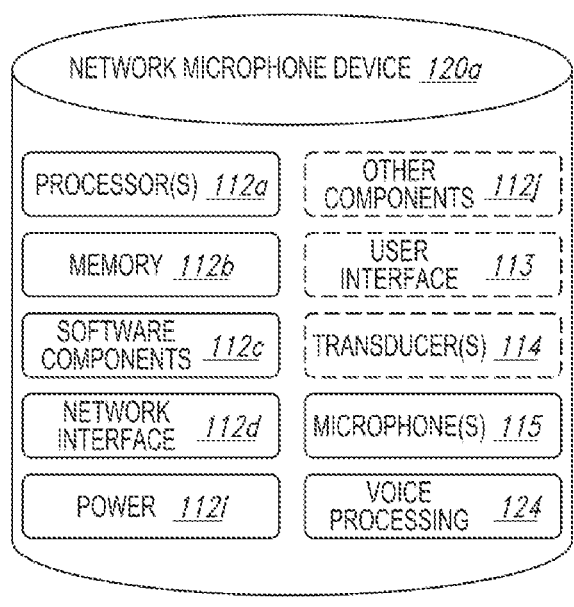
FIG. 1F
FIG. 1G
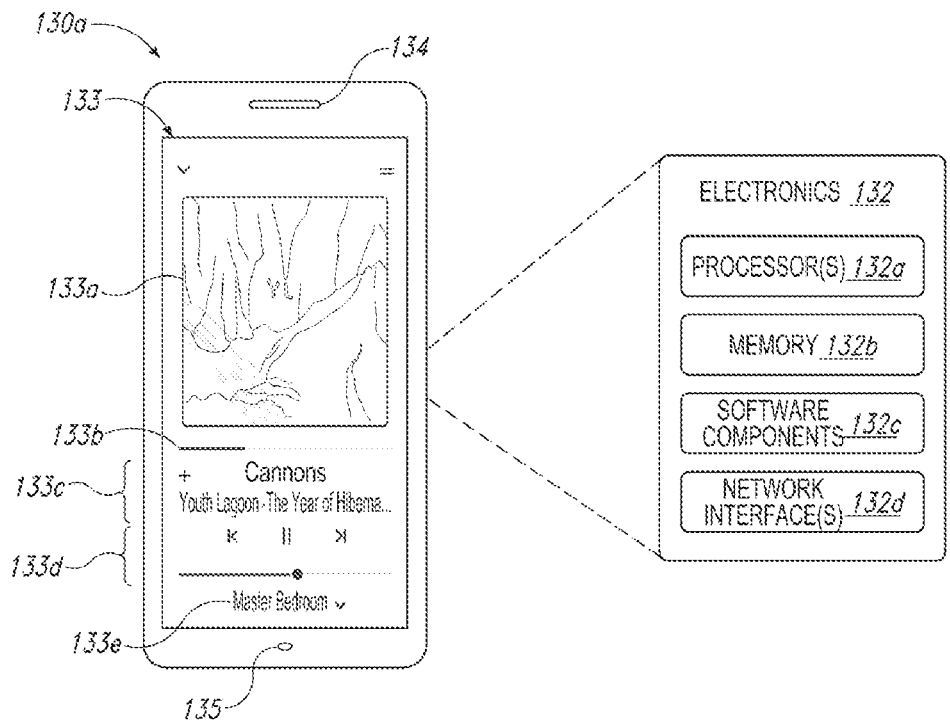
FIG. 1H

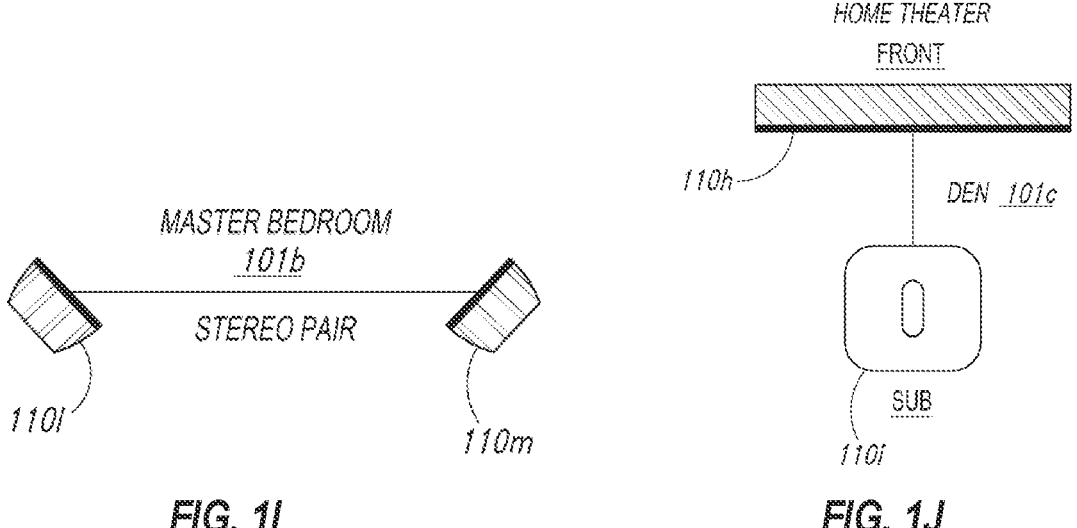
MASTER BEDROOM
*101b*
STEREO PAIR
*110l*                    *110m*
FIG. 1I
HOME THEATER
FRONT
*110h*          DEN  *101c*
SUB
*110i*
FIG. 1J
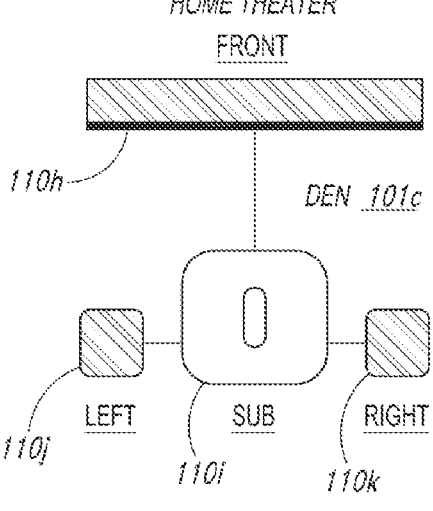
HOME THEATER
FRONT
*110h*          DEN  *101c*
LEFT          SUB          RIGHT
*110j*          *110i*          *110k*
FIG. 1K
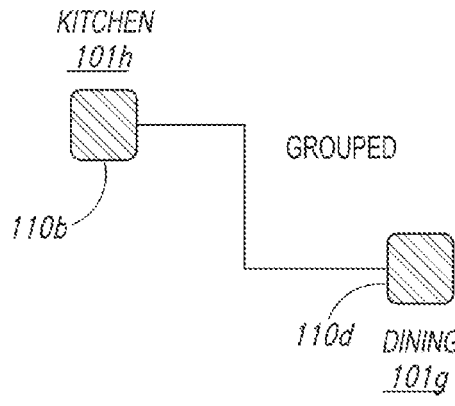
KITCHEN
*101h*
GROUPED
*110b*
*110d*    DINING
*101g*
FIG. 1L

1200

| | Free ○ | Slide 3mm(left) ⇓ | Press 0.7mm ⇐ | Slide 3mm(right) ⇑ |
|---|---|---|---|---|
| Hall-effect Switch 1132a | High | Low | High | High |
| Hall-effect Switch 1132b | High | High | Low | High |
| Hall-effect Switch 1132c | High | High | High | Low |

*FIG. 12*

MECHANICAL SLIDER FOR HEADPHONES

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1C is a block diagram of a playback device.

FIG. 1D is a block diagram of a playback device.

FIG. 1E is a block diagram of a network microphone device.

FIG. 1F is a block diagram of a network microphone device.

FIG. 1G is a block diagram of a playback device.

FIG. 1H is a partial schematic diagram of a control device.

FIGS. 1I through 1L are schematic diagrams of corresponding media playback system zones.

FIG. 12 illustrates a chart of various signals received by hall-effect switches that are integrated within a linear-travel mechanical switch.

Figure 1A:
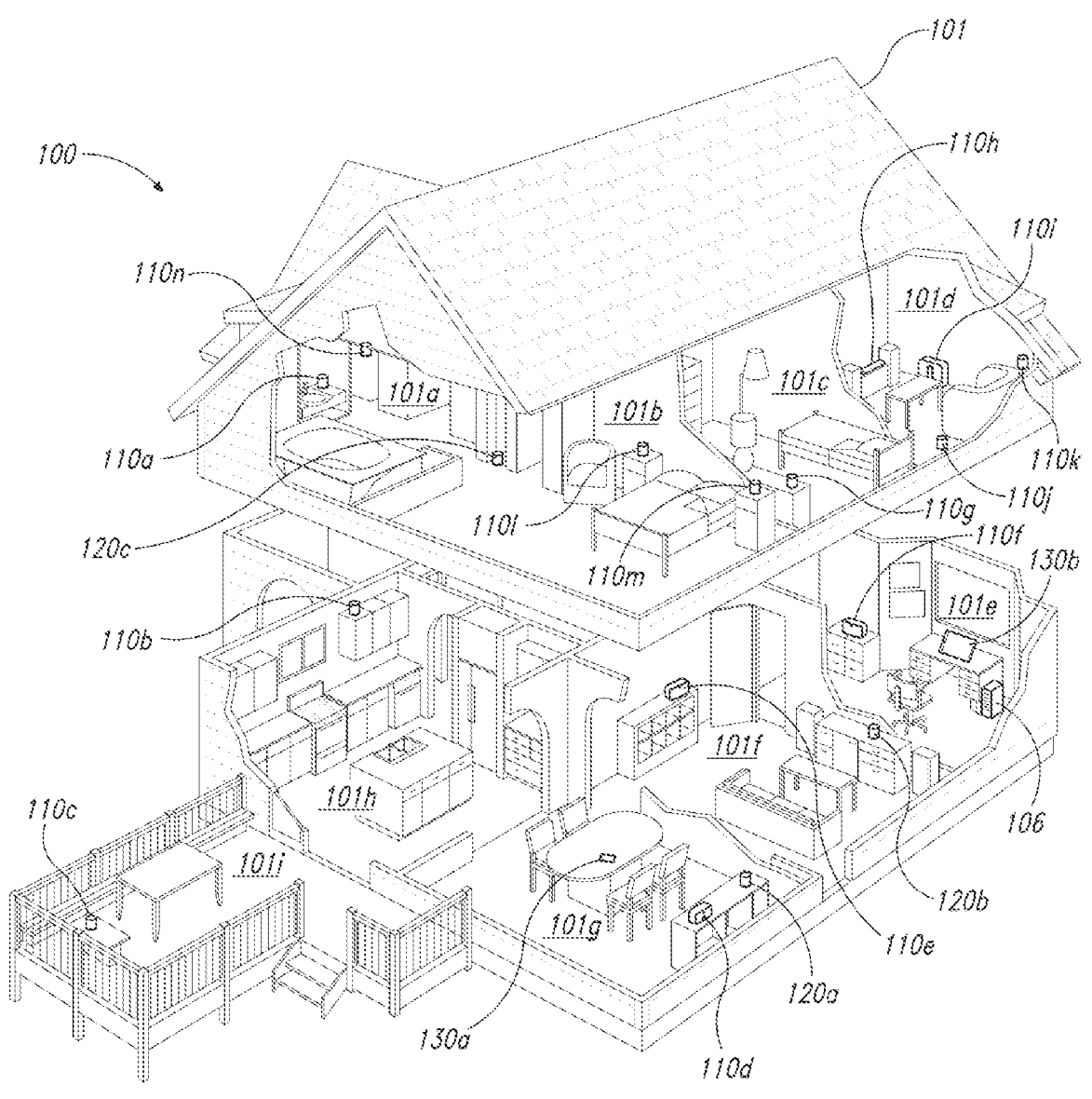
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to user interface for a headphone. The user interface may provide a user with an elegant and intuitive interface for controlling features in an advanced headphone. One of skill in the art will appreciate that modern headphones comprise many technologically advanced features. These features range from the convention playback of audio content to interacting with voice assistants, taking phone calls, noise cancellation technologies, and other similarly advanced features. Many end users frequently engage with many, if not all, of these advanced features, but wish to do so in an intuitive and elegant way.

As such, there is significant work to be done in developing innovative user interfaces that can elegantly fit on a headphone while providing an end user with an intuitive user experience.

In some embodiments, for example, a linear-travel mechanical switch for use in a headphone comprises a user button attached to a plunger that extends into a body of the headphone. A travel pathway extends a distance in a first linear direction from the plunger and a distance in a second, opposite linear direction from the plunger. In various embodiments, the travel pathway may extend from 1 mm-10 mm in either direction. At least one bias device integrated into the linear-travel mechanical switch biases the plunger to a middle position along the travel pathway. A plunger button is located such that depressing the user button engages the plunger button. A first button is located such that a movement of the user button long the travel pathway in the first linear direction engages the first button. A second button is located such that a movement of the user button long the travel pathway in the second, opposite linear direction engages the second button.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices 120 ("NMDs") (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term "NMD" (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 110a) in synchrony with a second playback device (e.g., the playback device 110b). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a main bathroom 101a, a main bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed, to form, for example, the configuration shown in FIG. 1A. Each zone may be given a name according to a different room or space such as the office 101e, main bathroom 101a, main bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the main bathroom 101a, the second bedroom 101c, the office 101e, the living room 101f, the dining room 101g, the kitchen 101h, and the outdoor patio 101i each include one playback device 110, and the main bedroom 101b and the den 101d include a plurality of playback devices 110. In the main bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
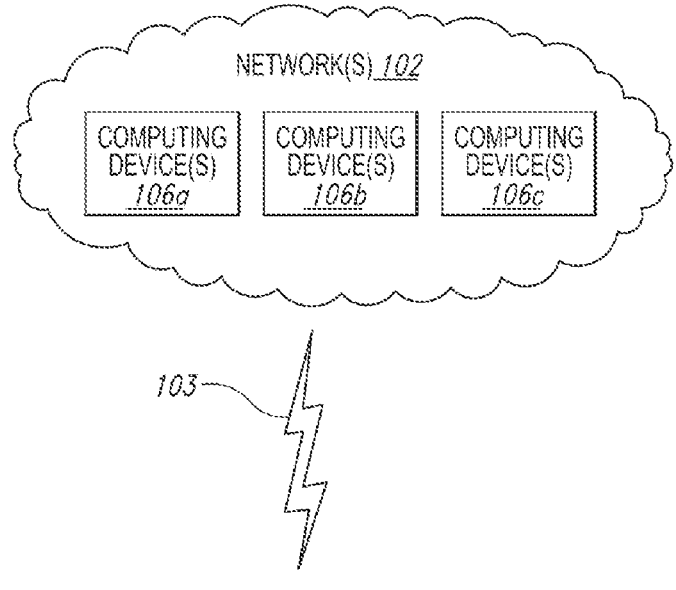
FIG. 1B is a schematic diagram of the media playback system of FIG. 1A and one or more networks.
Figure 1B:
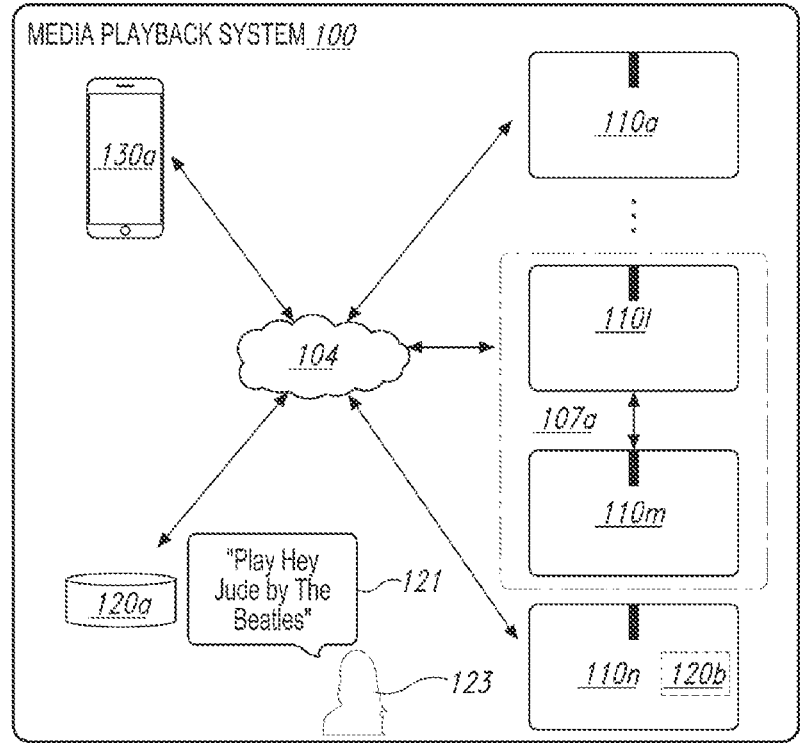

FIG. 1B is a schematic diagram of the media playback system 100 and a cloud network 102. For case of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, 6 GHZ, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links. The network 104 may be referred to herein as a "local communication network" to differentiate the network 104 from the cloud network 102 that couples the media playback system 100 to remote devices, such as cloud services.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110 and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110.

The media playback system 100 includes the NMDs 120*a* and 120*b*, each comprising one or more microphones configured to receive voice utterances from a user. In the illustrated embodiment of FIG. 1B, the NMD 120*a* is a standalone device and the NMD 120*b* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) facilitate one or more operations on behalf of the media playback system 100.

In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103.

In response to receiving the voice input data, the computing device 106*c* processes the voice input data (i.e., "Play Hey Jude by The Beatles"), and determines that the processed voice input includes a command to play a song (e.g., "Hey Jude"). In some embodiments, after processing the voice input, the computing device 106*c* accordingly transmits commands to the media playback system 100 to play back "Hey Jude" by the Beatles from a suitable media service (e.g., via one or more of the computing devices 106) on one or more of the playback devices 110. In other embodiments, the computing device 106*c* may be configured to interface with media services on behalf of the media playback system 100. In such embodiments, after processing the voice input, instead of the computing device 106*c* transmitting commands to the media playback system 100 causing the media playback system 100 to retrieve the requested media from a suitable media service, the computing device 106*c* itself causes a suitable media service to provide the requested media to the media playback system 100 in accordance with the user's voice utterance.

b. Suitable Playback Devices

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 are configured to receive audio from an audio source (e.g., the local audio source 105) via the input/output 111 or one or more of the computing devices 106*a*-*c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT: AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings.

For instance, one or more playback devices 110 may comprise wired or wireless headphone playback devices (e.g., over-the-ear headphones, on-car headphones, in-car earphones). In some examples, the headphone playback device may be configured to operate in various operational modes dependent upon media-type and/or synchronized devices (e.g., music, home theater, etc.). For example, one mode may be a synchronized playback mode where the headphone playback device plays back audio content that is synchronized with playback of content output by another device. In one example, the synchronized playback mode includes a first headphone playback device playing back audio that is synchronized with a television set's playback of video corresponding to the audio that the first playback headphone device is playing back. In some examples, the audio may be home theater or surround sound audio. In another example, the synchronized playback mode includes the first headphone playback device playing back audio that is synchronized with a second headphone playback device's playback of the same audio that the first headphone device is playing. In yet another example, the synchronized playback mode includes the first playback device playing back audio that is synchronized with both (i) a television set's playback of video corresponding to the audio that the first headphone playback device is playing back and (ii) a second headphone playback device's playback of the same audio that the first headphone playback device is playing. Another mode may be a non-synchronized playback mode where the first headphone playback device plays back audio content that is not synchronized with content output by other devices (e.g., headphone playback device playing only audio content without synchronization to other devices).

In some embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device.

c. Suitable Network Microphone Devices (NMDs)

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partial schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130*a* to one or more of the playback devices 100. The network interface 132*d* can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100.

The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

c. Suitable Playback Device Configurations

Figure 1M:
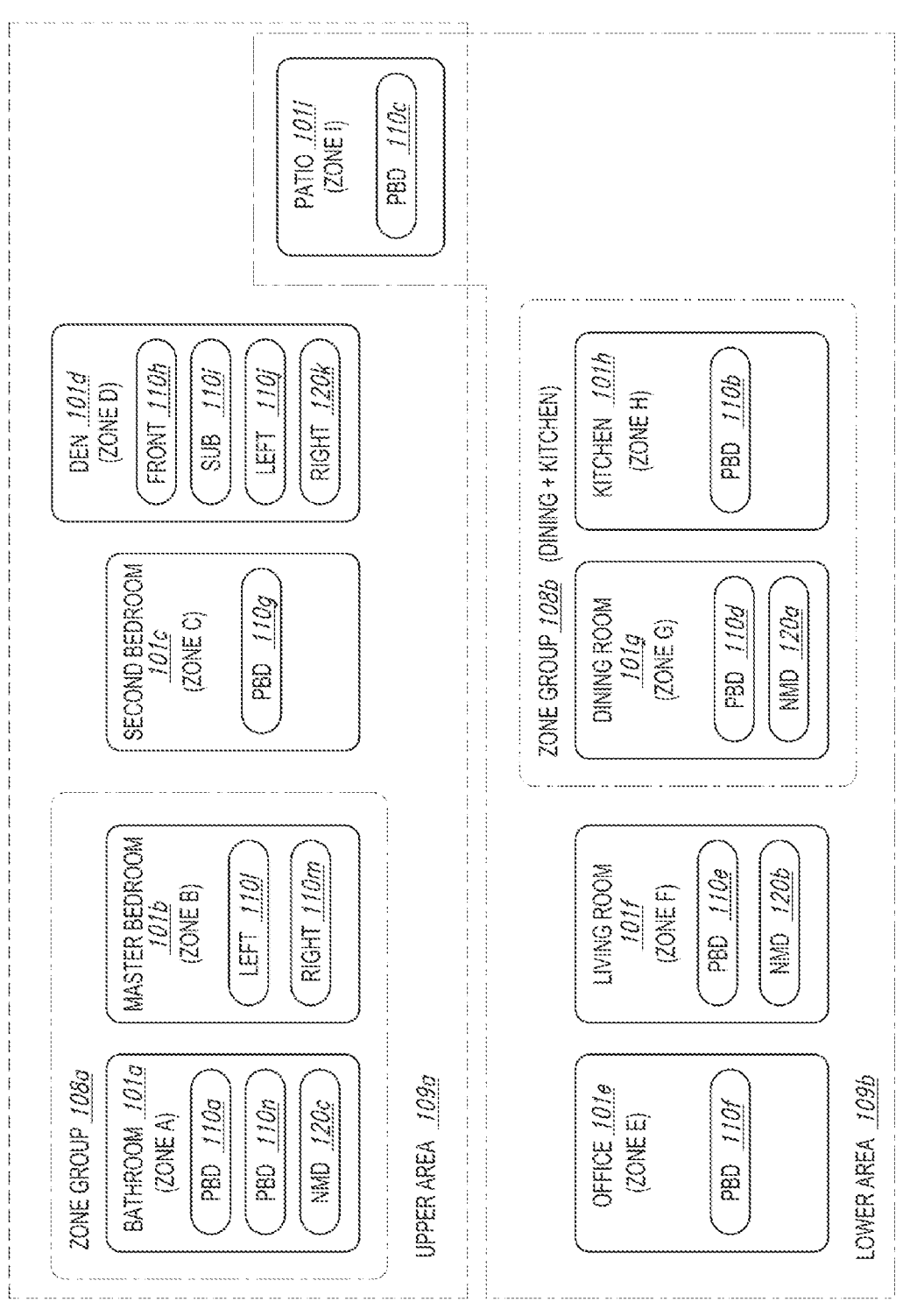
FIG. 1M is a schematic diagram of media playback system areas.

FIGS. 1-1 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Main Bathroom. Zone B may be provided as a single entity named Main Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 110k can be configured to form surround or "satellite" channels of a home theater system. The bonded playback devices 110h, 110i, 110j, and 110k may form a single Zone D (FIG. 1M).

Playback devices that are merged may not have assigned playback responsibilities and may each render the full range of audio content the respective playback device is capable of. Nevertheless, merged devices may be represented as a single UI entity (i.e., a zone, as discussed above). For instance, the playback devices 110a and 110n in the main bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have been assigned a name such as "Dining+Kitchen", as shown in FIG. 1M. In some embodiments, a zone group may be given a unique name selected by a user.

Certain data may be stored in a memory of a playback device (e.g., the memory 112c of FIG. 1C) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017, and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
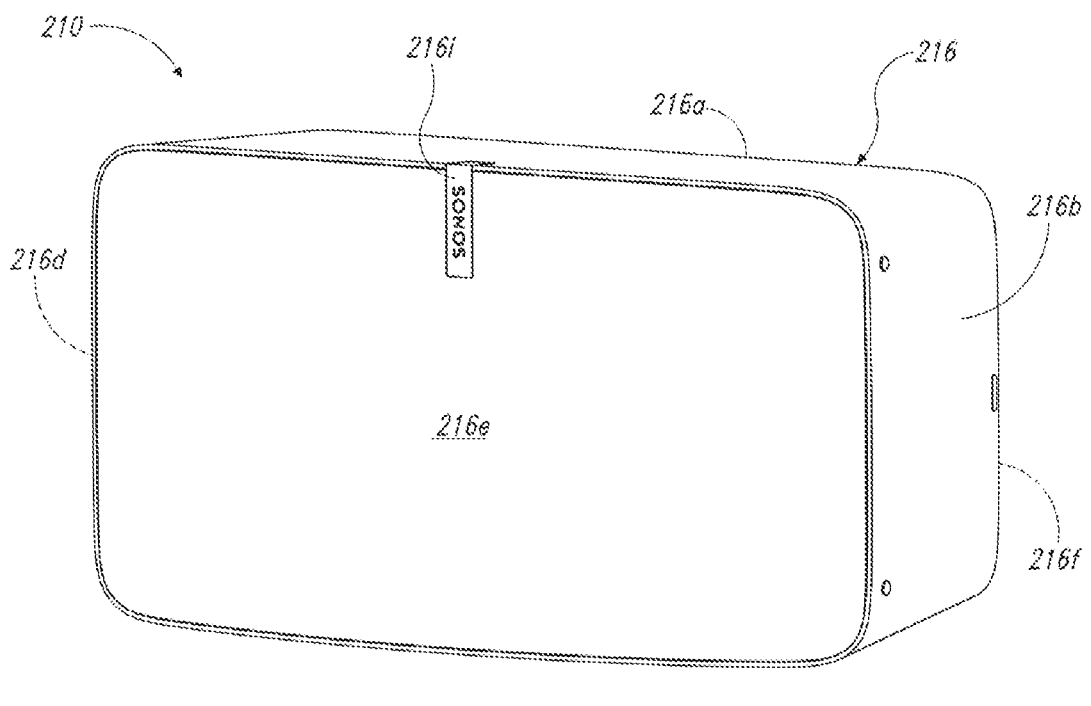
FIG. 2A is a front isometric view of a playback device configured in accordance with aspects of the disclosed technology.
Figure 2B:
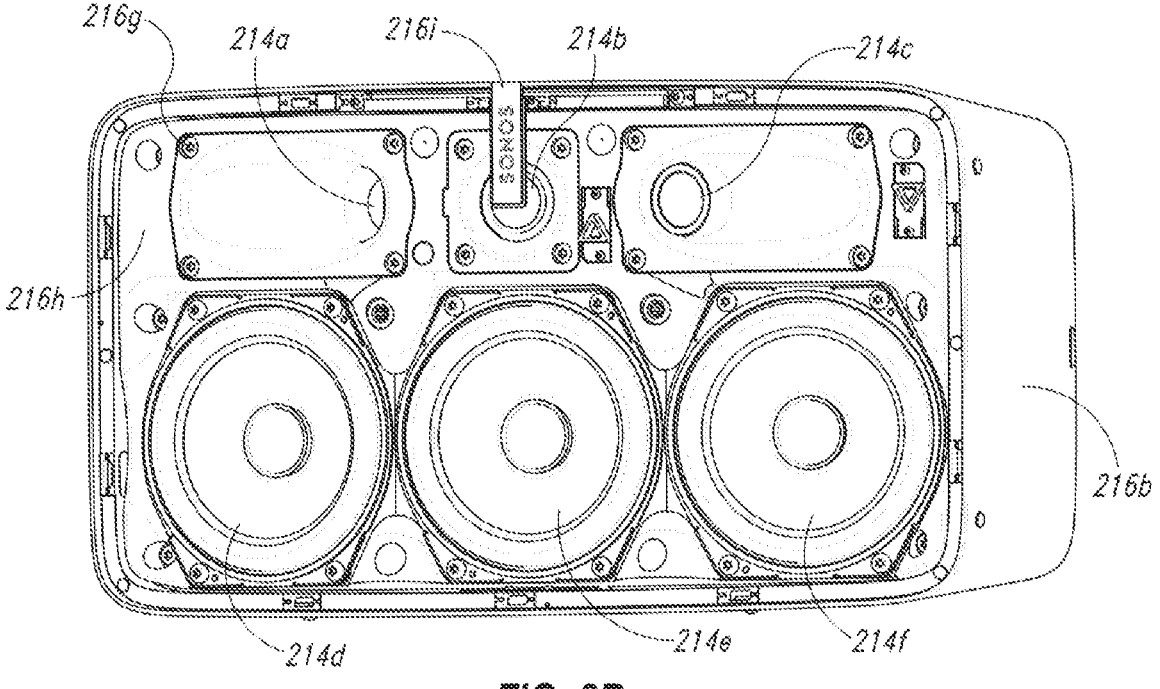
FIG. 2B is a front isometric view of the playback device of FIG. 3A without a grille.
Figure 2C:
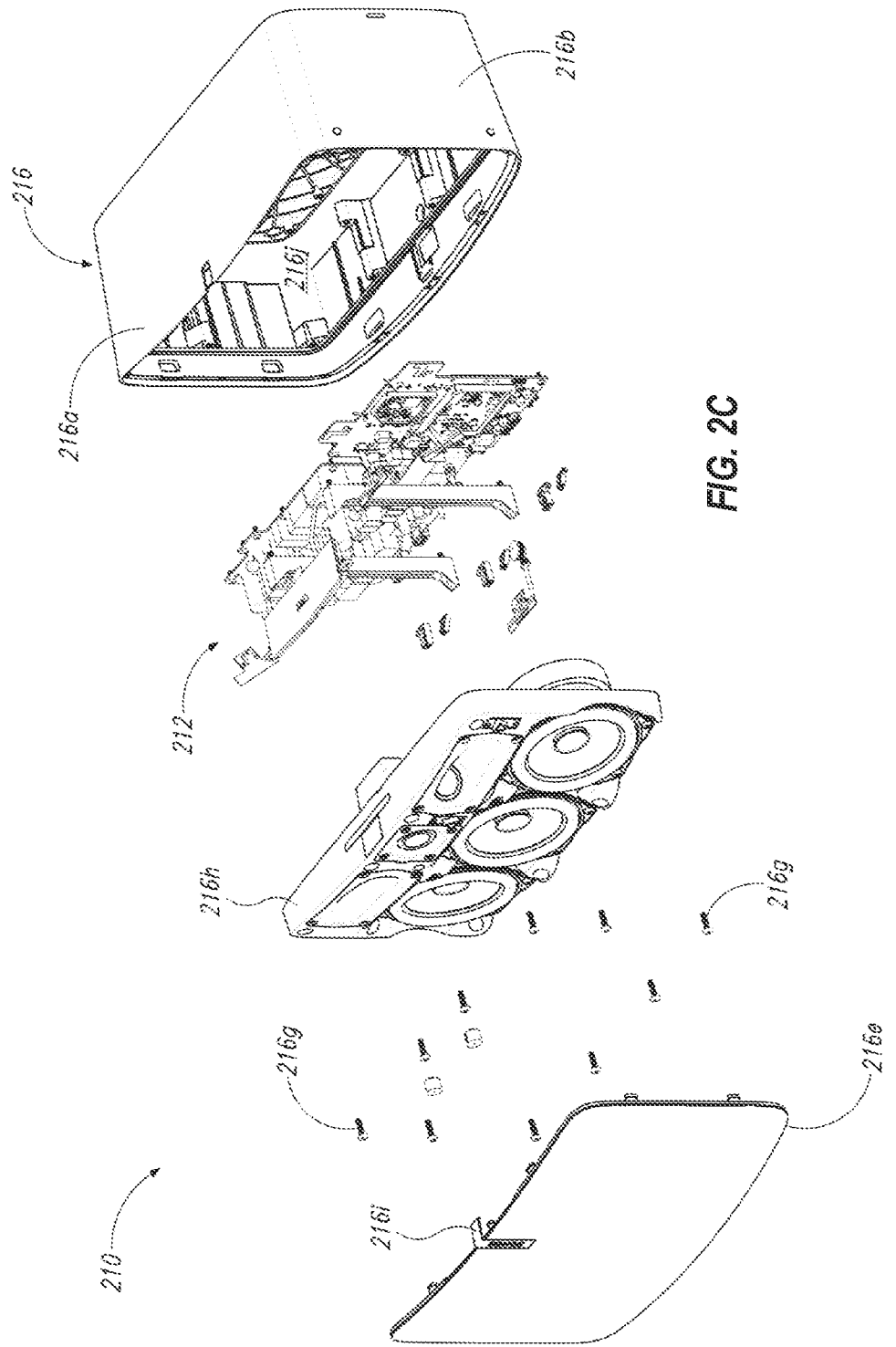
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
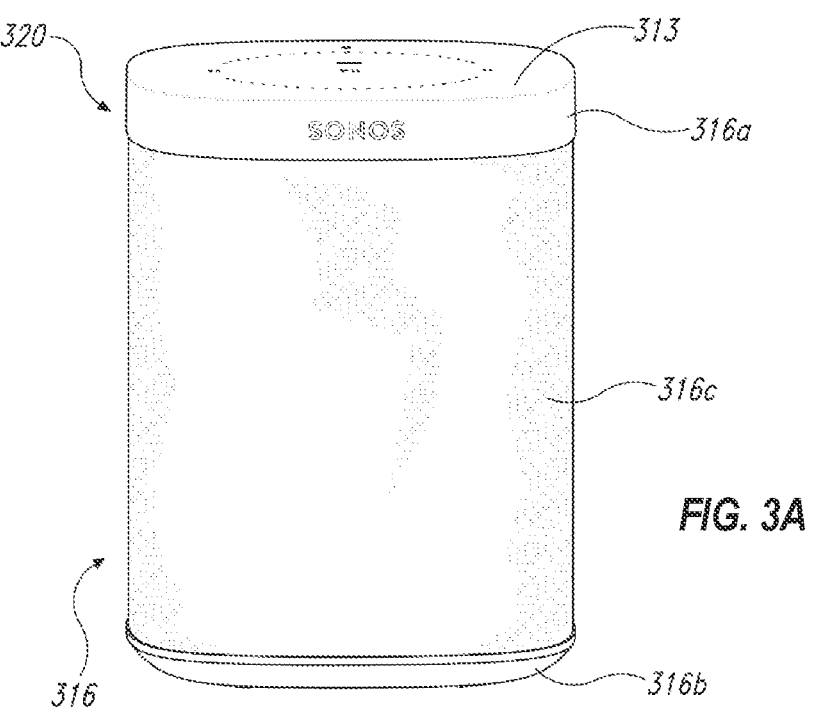
FIG. 3A is a front view of a network microphone device configured in accordance with aspects of the disclosed technology.
Figure 3B:
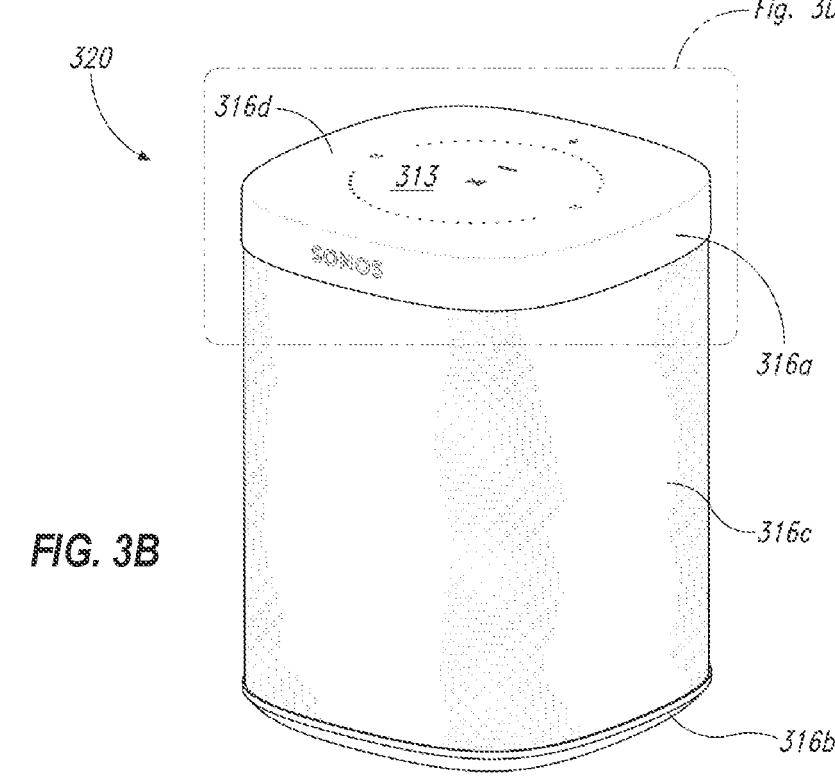
FIG. 3B is a side isometric view of the network microphone device of FIG. 3A.
Figure 3C:
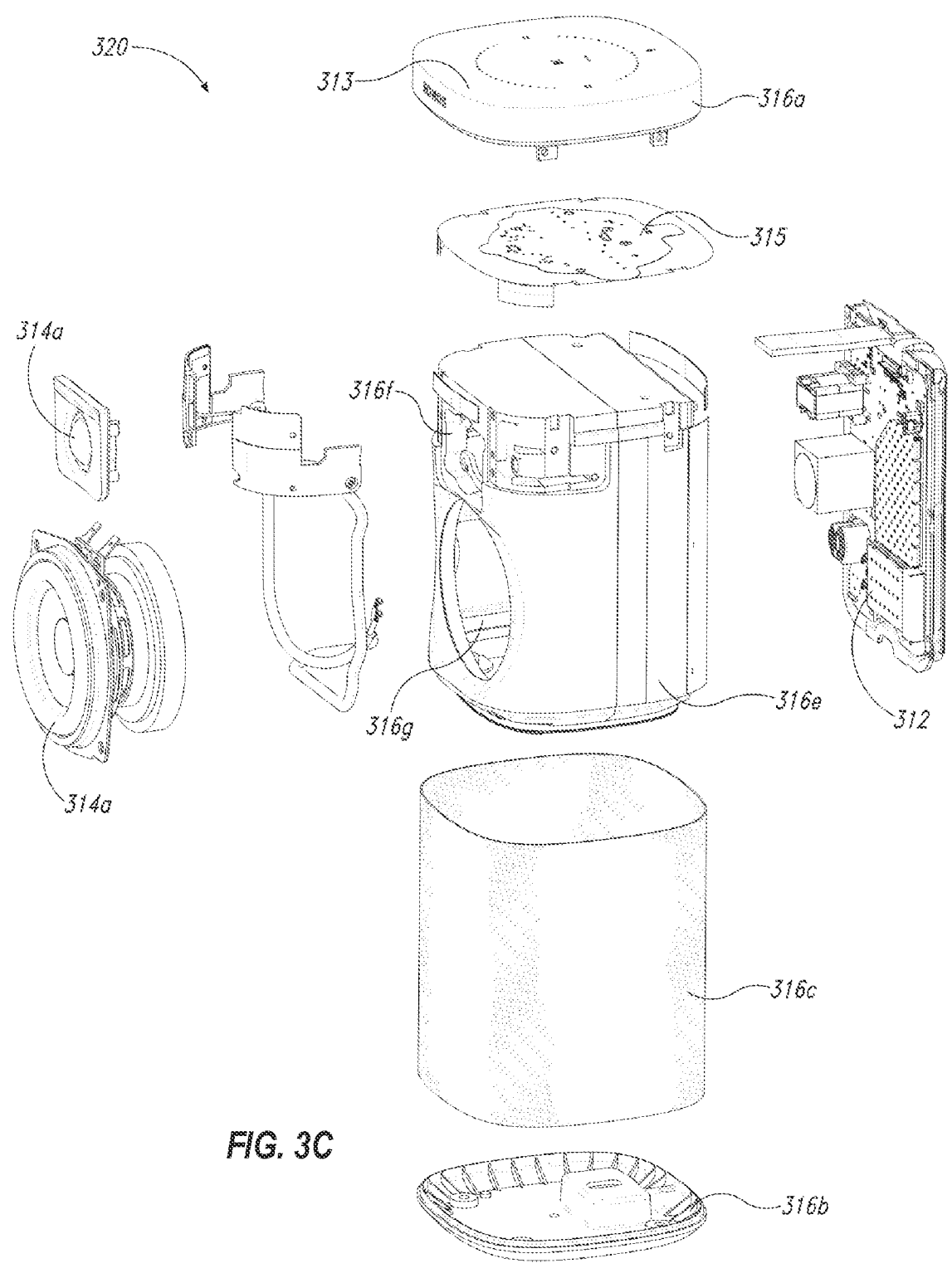
FIG. 3C is an exploded view of the network microphone device of FIGS. 3A and 3B.
Figure 3D:
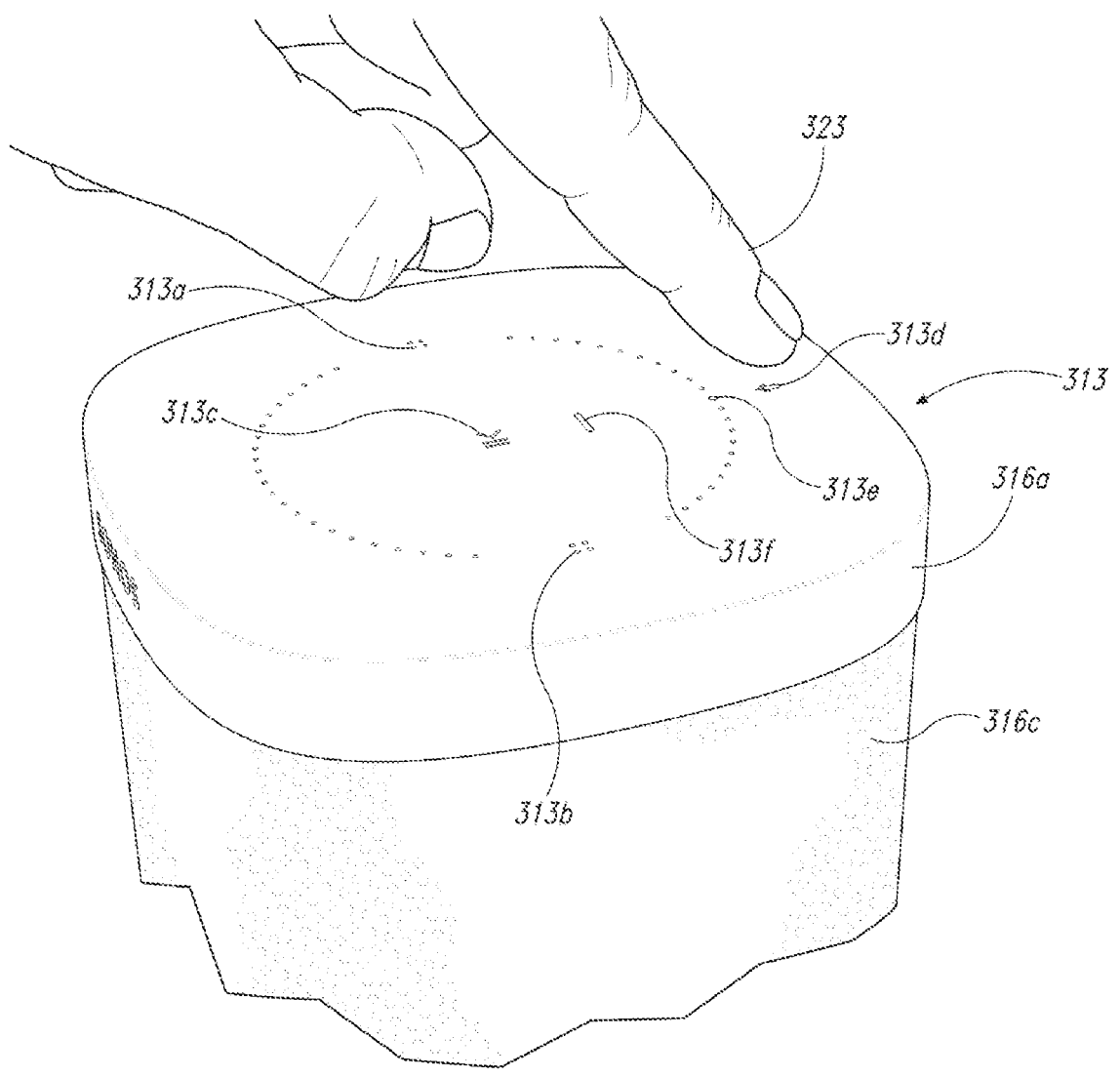
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input 323 corresponding to activation and deactivation of the one or microphones 315. A first indicator 313c (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figures 3E, 3F:
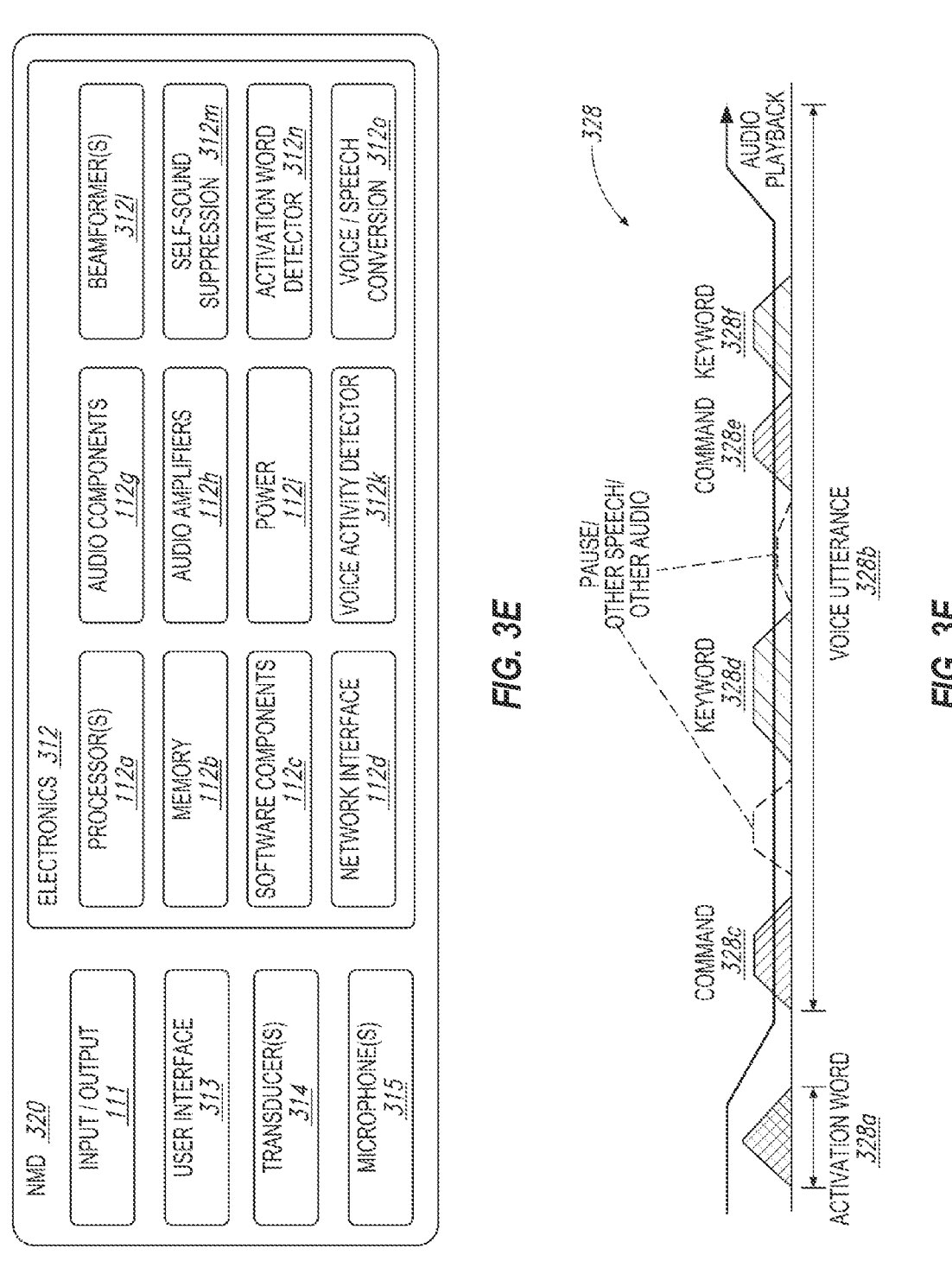
FIG. 3E is a block diagram of the network microphone device of FIGS. 3A-3D
FIG. 3F is a schematic diagram of an example voice input.

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise. The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

FIG. 3F is a schematic diagram of an example voice input 328 captured by the NMD 320 in accordance with aspects of the disclosure. The voice input 328 can include an activation word portion 328a and a voice utterance portion 328b. In some embodiments, the activation word 328a can be a known activation word, such as "Alexa," which is associated with AMAZON's ALEXA®. In other embodiments, however, the voice input 328 may not include an activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328c) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 328a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
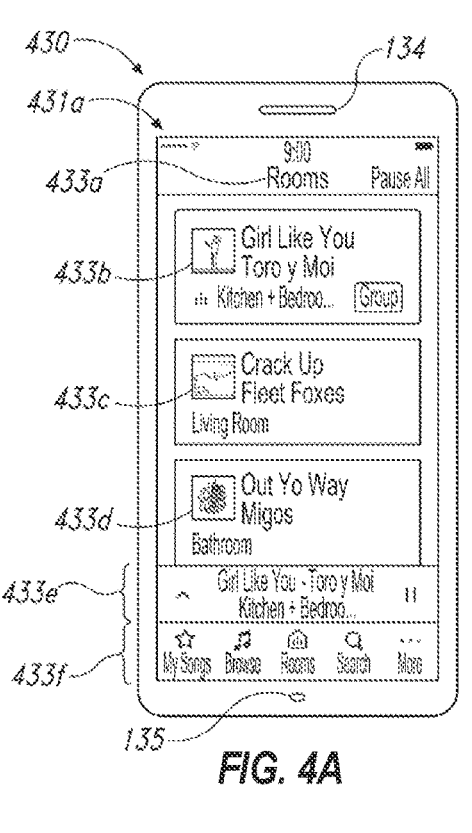
FIGS. 4A-4D are schematic diagrams of a control device in various stages of operation in accordance with aspects of the disclosed technology.
Figure 4B:
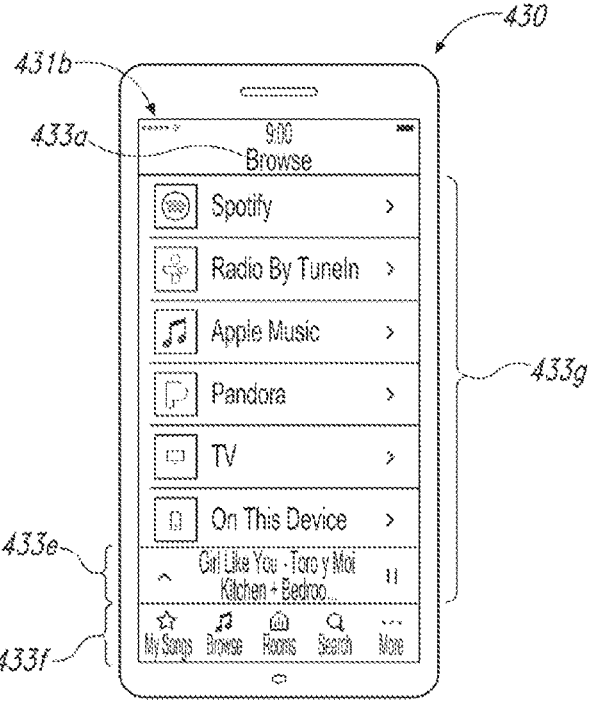
Figure 4C:
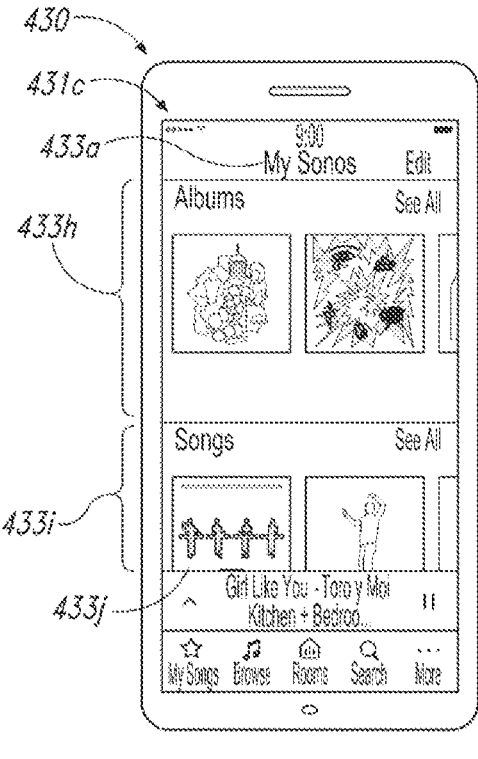
Figure 4D:
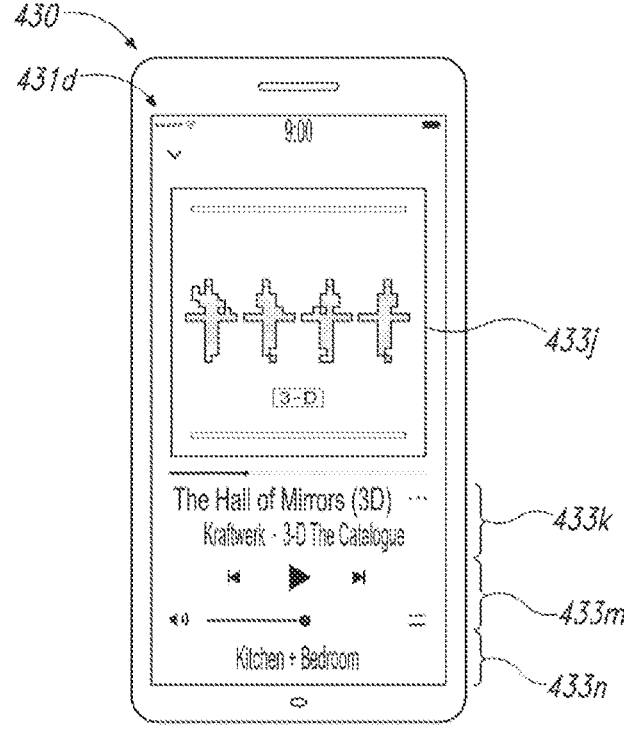

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433c includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
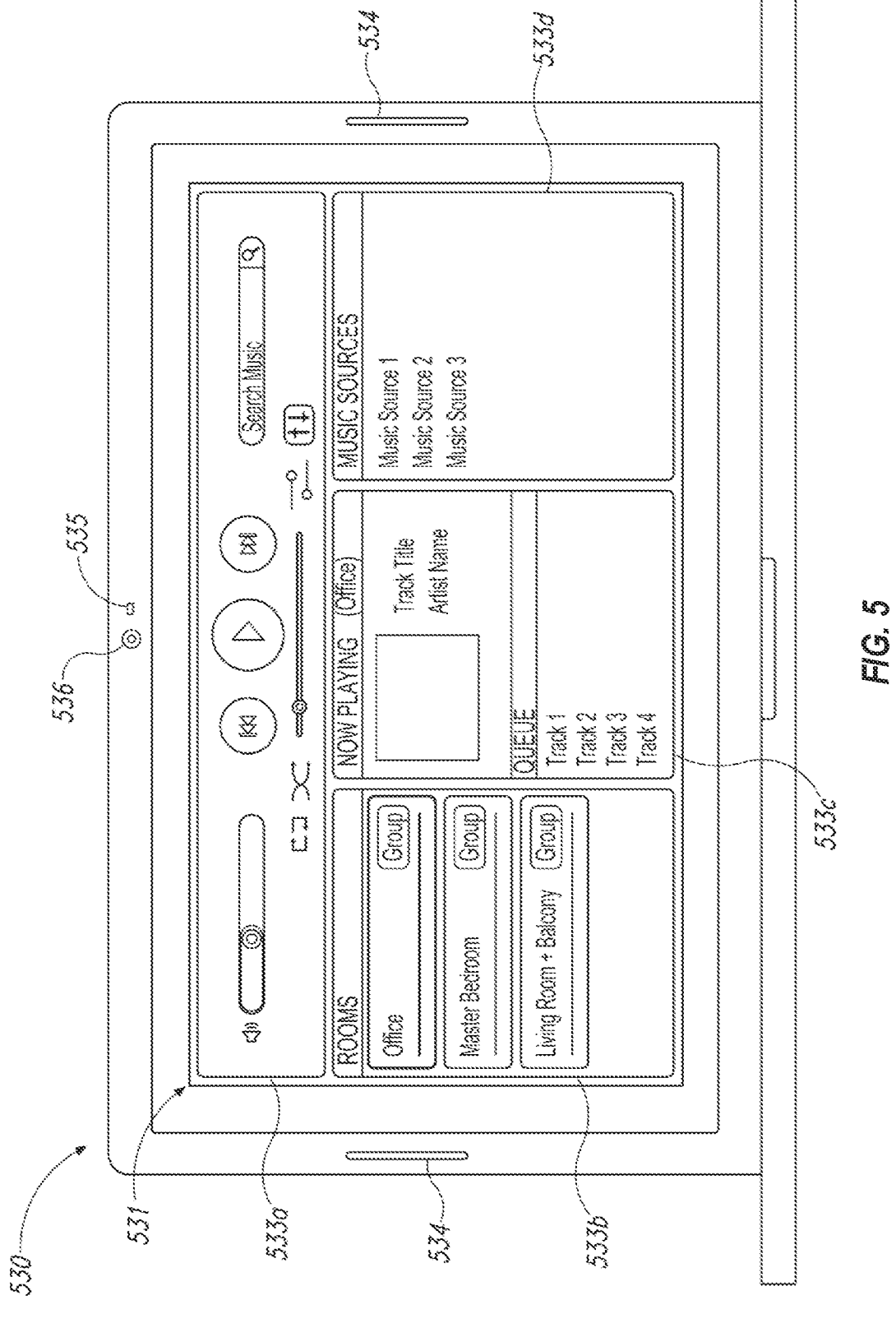
FIG. 5 is front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533c, and a media content source region 533c. The transport control region comprises one or more controls for controlling media playback including, for example, volume, previous, play/pause, next, repeat, shuffle, track position, cross-fade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

A playback status region 533d includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533c. The graphical representations may include track title, artist name, album name, album year, track length, and other relevant information that may be useful for the user to know when controlling the media playback system 100 via the user interface 531.

The playback queue region 533c includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or be associated with a new playback queue that is empty or contains audio items from the playback queue associated with the established zone group before the established zone group was ungrouped. Similarly, the resulting second playback zone may be re-associated with the previous second playback queue or be associated with a new playback queue that is empty or contains audio items from the playback queue associated with the established zone group before the established zone group was ungrouped.

Figure 6:
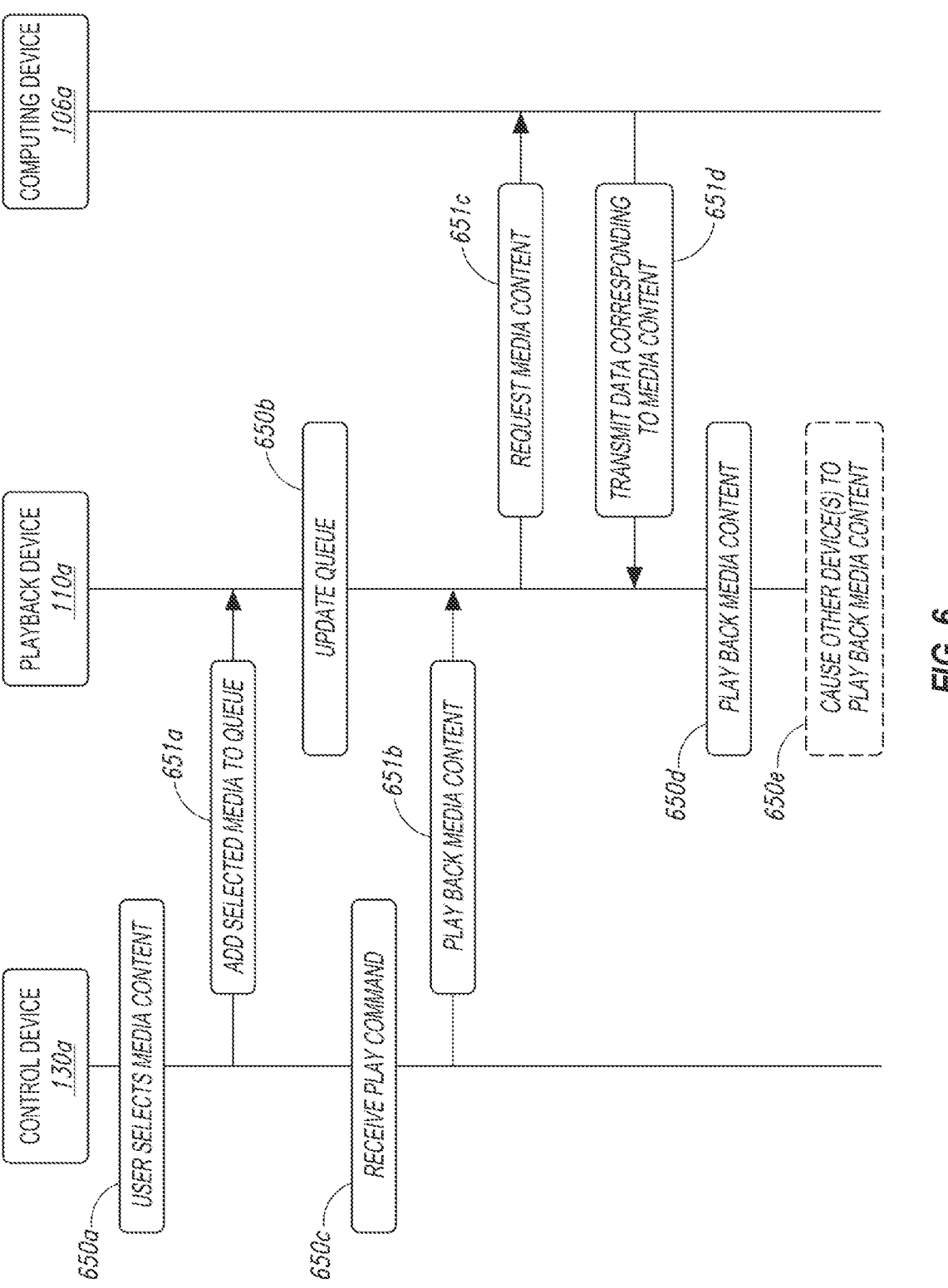
FIG. 6 is a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 65a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the computing device 106a requesting the selected media content. The computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650c, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the computing device 106a and begin playback of the selected media content in response to a message from the playback device 110a such that all of the devices in the group play back the selected media content in synchrony.

III. Example Headphone Playback Devices and Hardware User Interfaces

In some embodiments disclosed herein, at least one playback device 110 is a headphone having two or more speaker drivers and electronics for receiving, generating, and/or processing an audio signal such as those described above with respect to FIG. 1C. The speaker drivers may be a housed in a left earcup and a right earcup that each also have an earpad for resting on a user's head. In several embodiments, the earcups are joined by a headband. In further embodiments, the wireless headphone is a playback device 110 that is also a network microphone device (NMD), equipped with a microphone, such as those described above with respect to FIG. 1F. These headphones may be utilized in a media playback system such as those illustrated in FIGS. 1A and 1B.

Playback of audio in a headphone typically utilizes one or more audio drivers within each earcup to create sound waves that travel to a user's ear. In various embodiments, the playback of audio in the headphones is controlled using an external control device 130 (e.g., a smartphone), through voice commands received at an NMD 120 (including an NMD 120 integrated into the headphone), and/or through a user interface 313 integrated into the headphone 720 itself.

FIGS. 7A-7D depict various example user interfaces 313, in the form of a linear-travel mechanical switch 700. In at least one embodiment, the linear-travel mechanical switch 700 travels in a substantially linear or purely linear sliding motion. For example, in at least one embodiment, the linear-travel mechanical switch 700 does not travel in a rotational or curved pathway but instead travels linearly while remaining in a single plane that is perpendicular to the direction of travel. In at least one embodiment, it is desirable for the linear-travel mechanical switch 700 to be able to travel 1 mm to 10 mm in either direction. In additional or alternative embodiments, it is desirable for the linear-travel mechanical switch 700 to be able to travel at least 4 mm in either direction. Further, in additional or alternative embodiments, it is desirable for the linear-travel mechanical switch 700 to be able to travel at least 3 mm in either direction or at least 2 mm in either direction. One of skill will appreciate that the travel distance of a switch can have a significant impact on its useability and function with end users. For example, a switch with too little travel may not provide sufficient physical feedback for a user to appreciate whether the switch has been engaged. In contrast, a switch with too much travel may be cumbersome for an end user to utilize due to the excessive movement required to engage the switch.

Figure 7A:
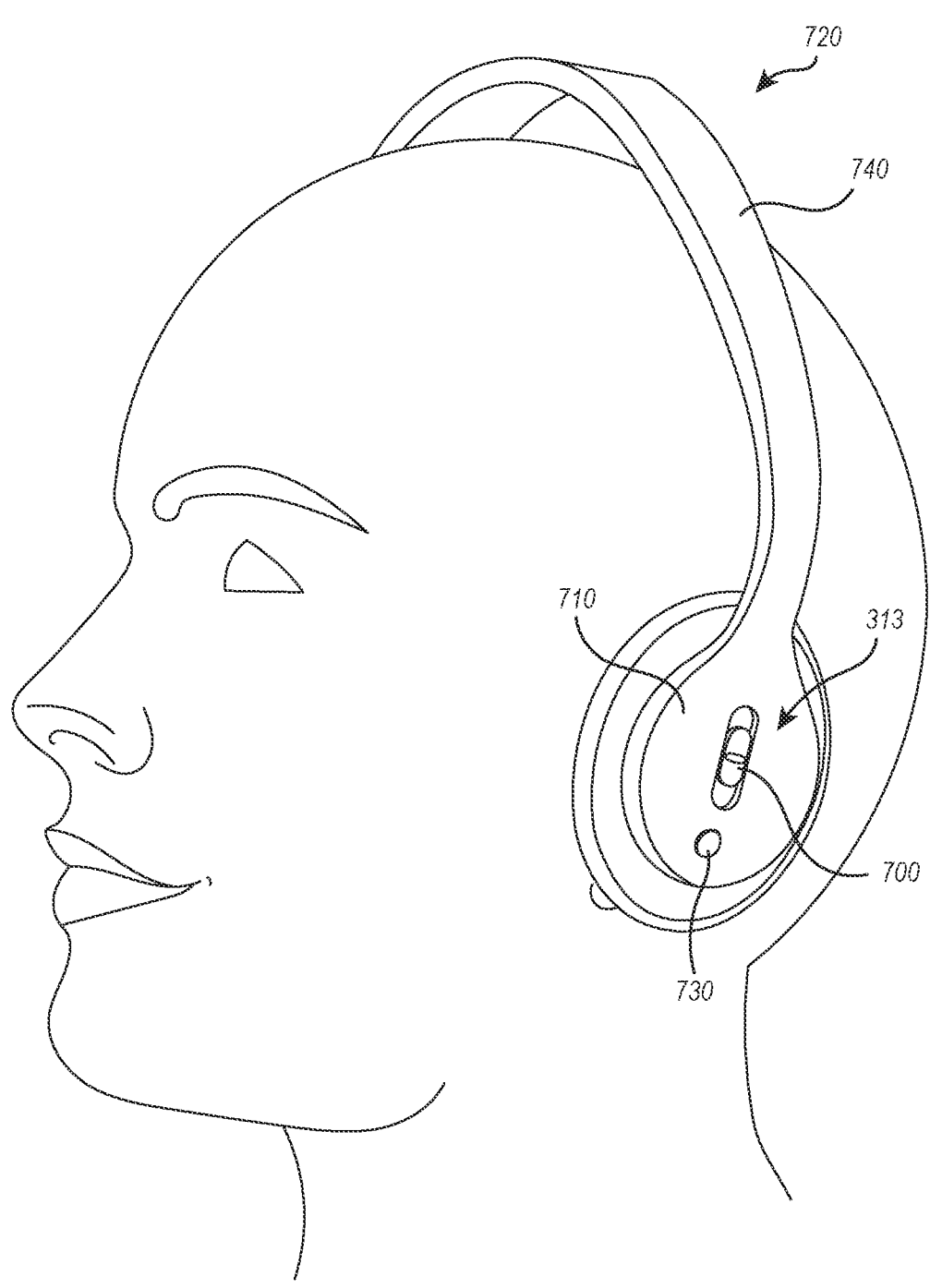
FIGS. 7A-7D depict different linear-travel mechanical switches on various examples of headphones.
Figure 7B:
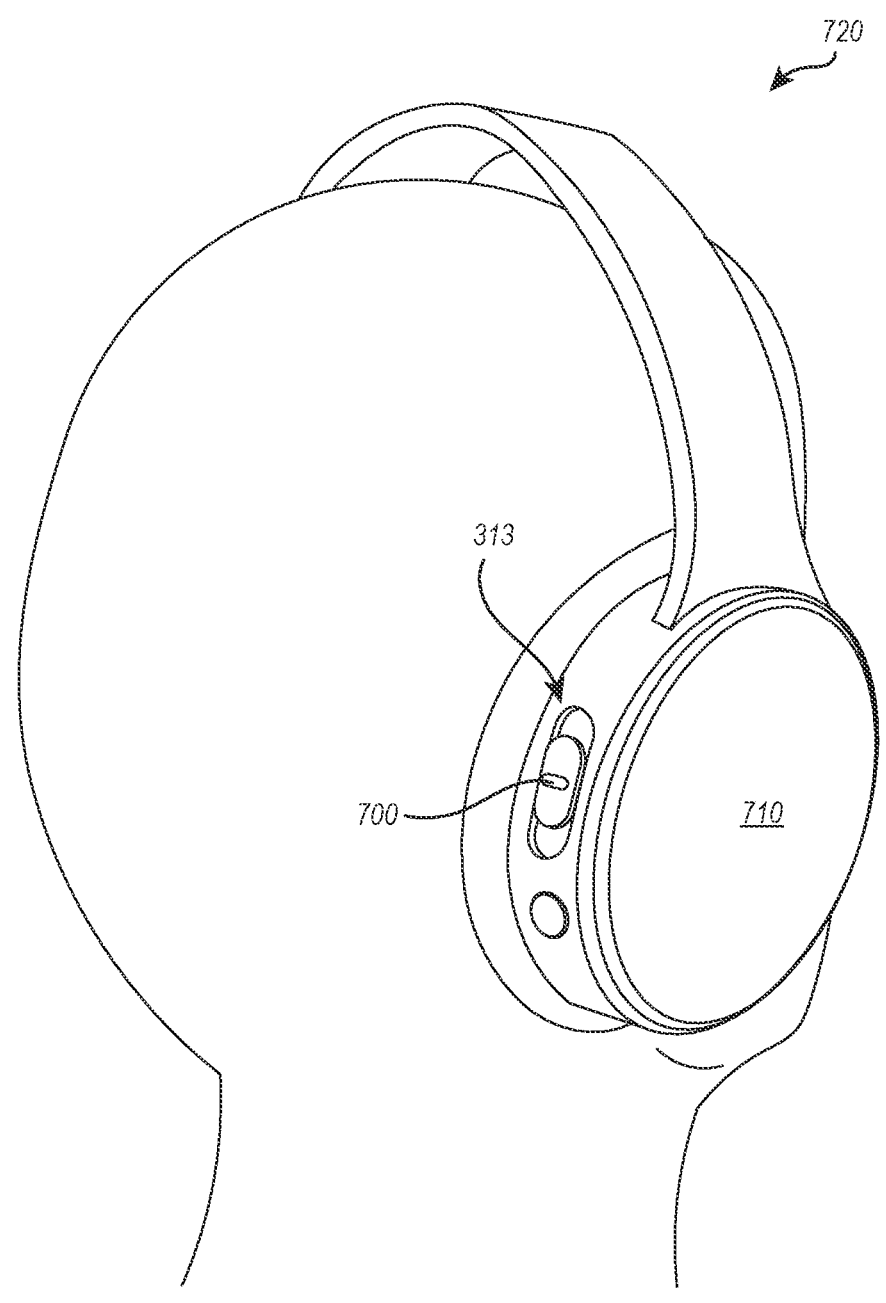
Figure 7C:
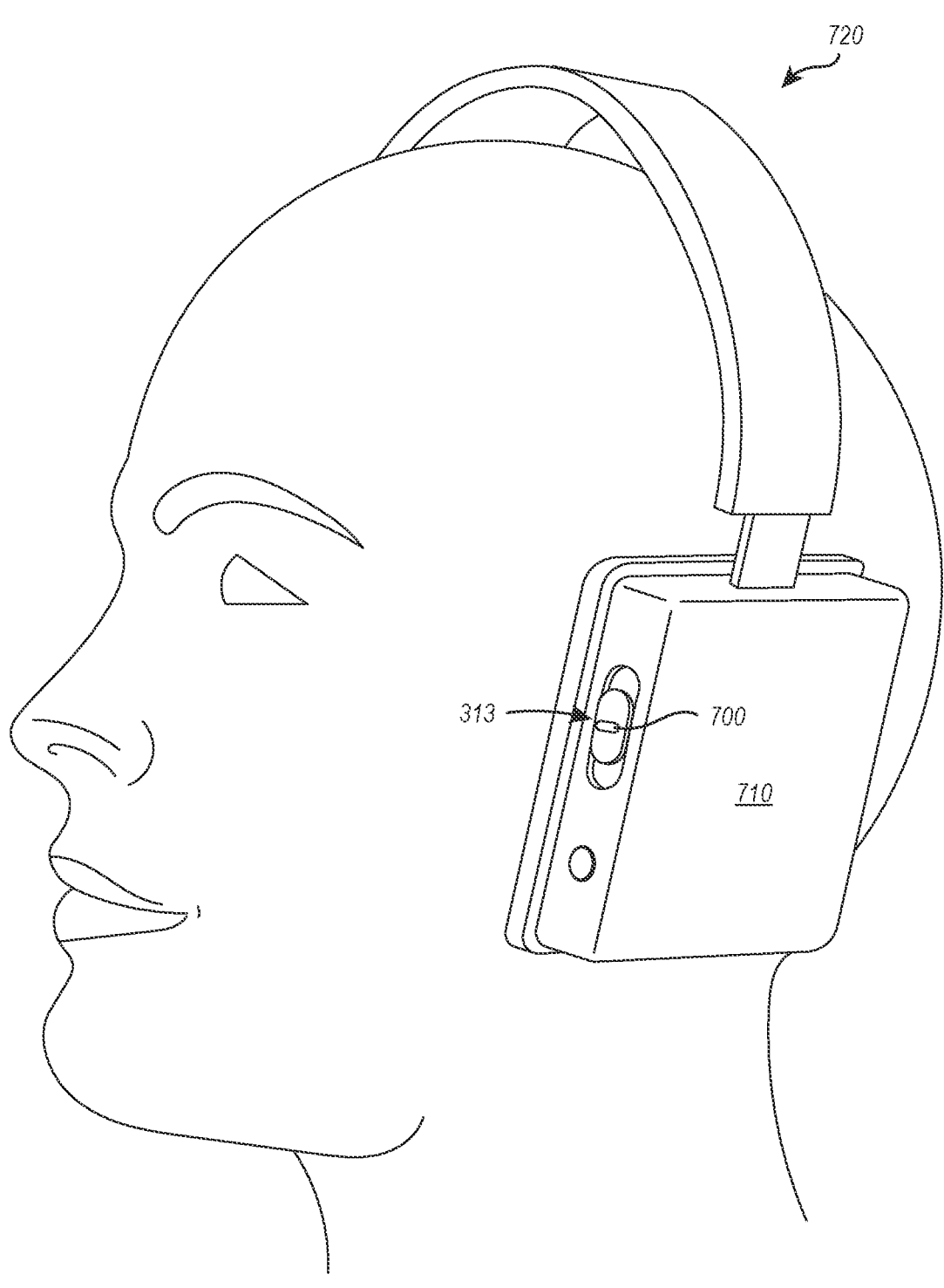
Figure 7D:
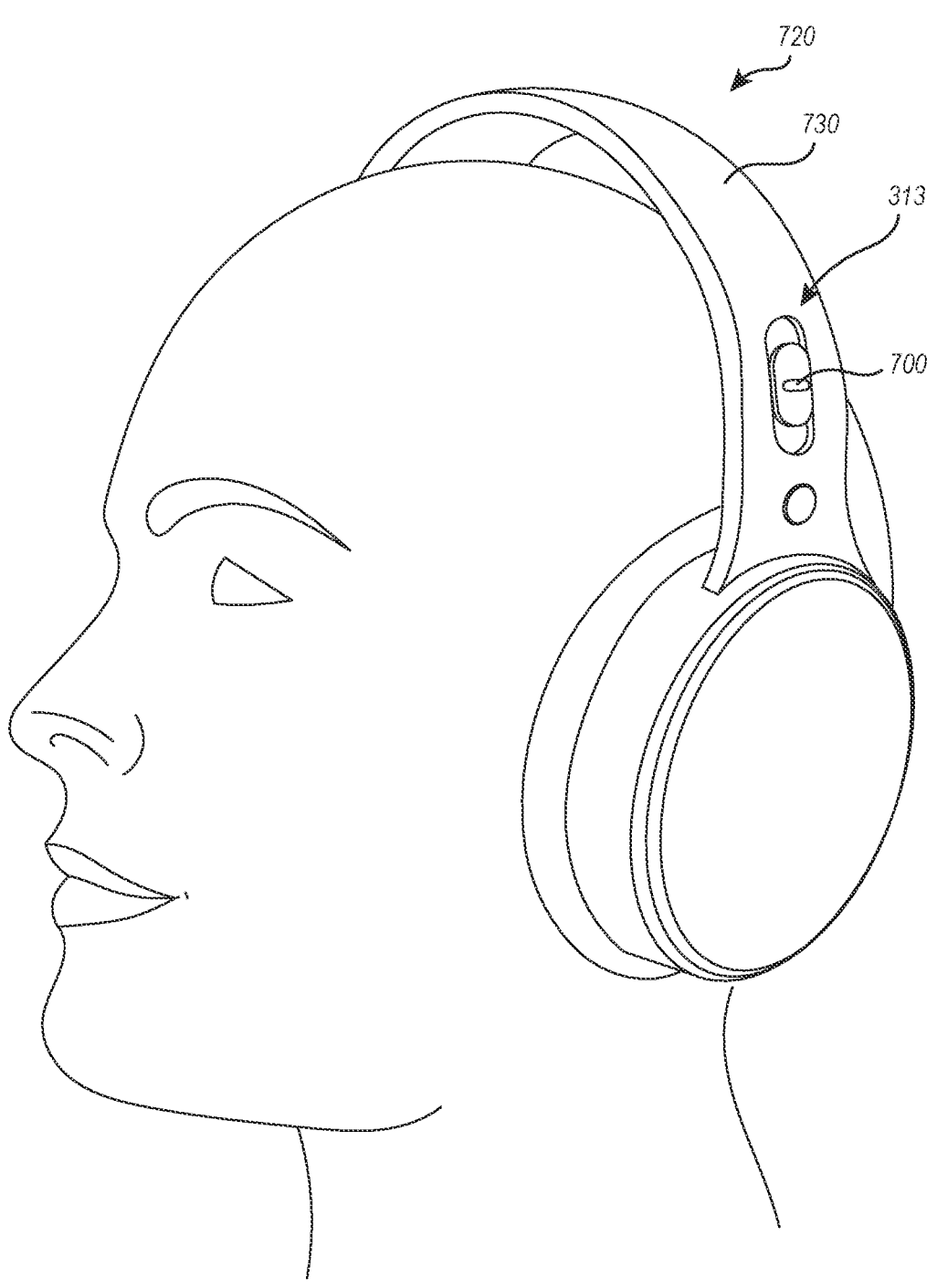

In FIG. 7A, the linear-travel mechanical switch 700 is depicted as being located on an outer face of an earcup 710 on the headphone 720. The linear-travel mechanical switch 700 of FIG. 7A may be operated by a user's index finger. Additional user interface elements, such as an additional button 730, may also be located near the linear-travel mechanical switch 700. In FIG. 7B, the linear-travel mechanical switch 700 is located on the back side of an ear cup 710 of the headphone 720. The linear-travel mechanical switch 700 of FIG. 7B may be operated by a user's thumb. In FIG. 7C, the linear-travel mechanical switch 700 is located on the front side of an ear cup 710 of the headphone 720. The linear-travel mechanical switch 700 of FIG. 7C may be operated by a user's index finger. In FIG. 7D, the linear-travel mechanical switch 700 is located on the headband 740 of the headphone 720. The linear-travel mechanical switch 700 of FIG. 7D may be operated by a user's index finger.

In the above and below examples and explanations, several different embodiments of a linear-travel mechanical switch 700 are provided. These examples are provided for the sake of example and explanation and are not intended to be limiting to the invention unless expressly stated otherwise. Additionally, various features that are disclosed with respect to a particular figure can be integrated and used in the other figures, unless expressly stated otherwise.

Figures 8A, 8B:
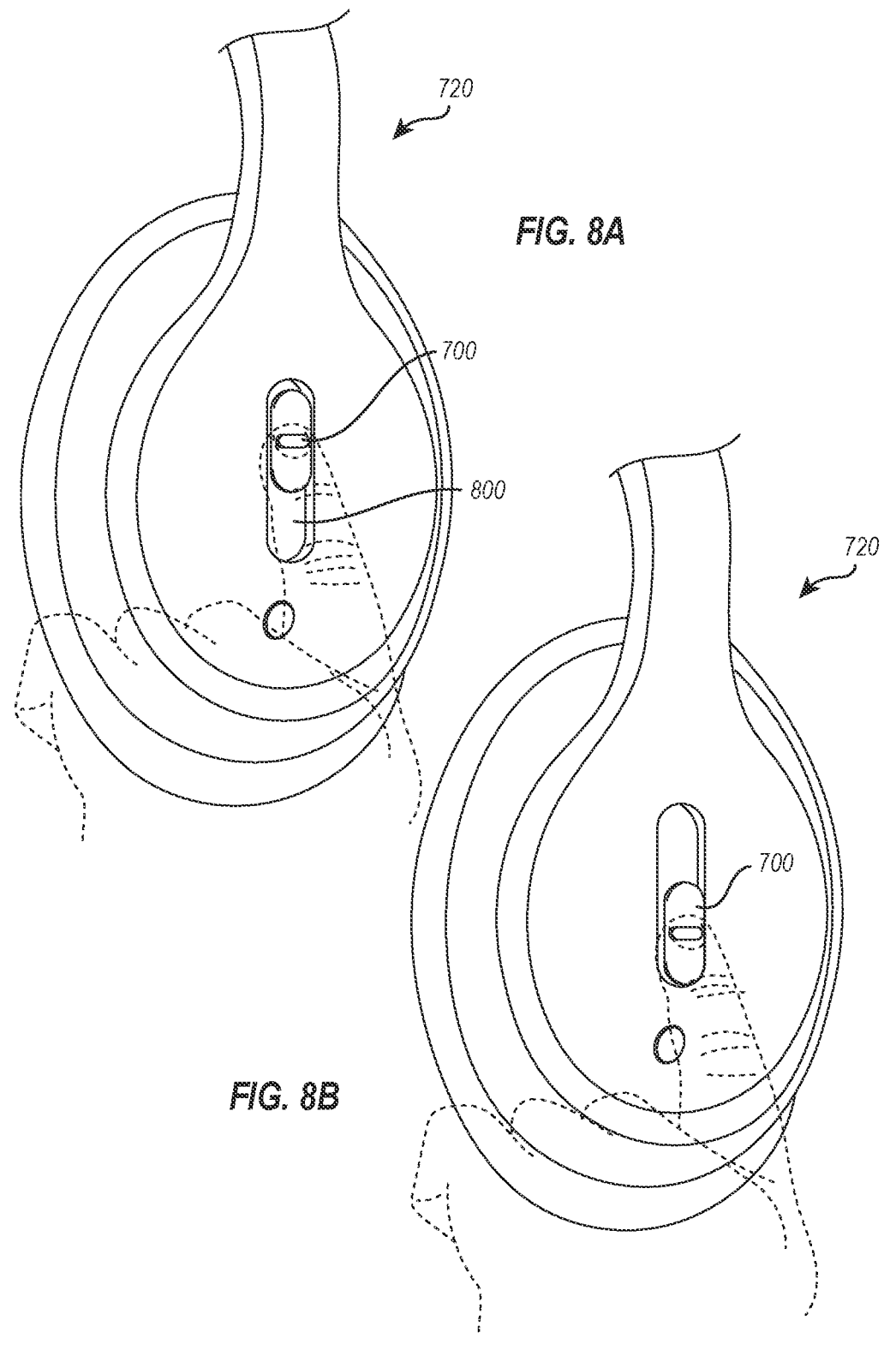
FIG. 8A depicts a user moving a linear-travel mechanical switch upward with respect to the headphone.
FIG. 8B depicts a user moving a linear-travel mechanical switch downward with respect to the headphone.

FIGS. 8A and 8B depicts a human hand actuating the linear-travel mechanical switch 700. In FIG. 8A, the linear-travel mechanical switch 700 has been actuated through a linear movement upward relative to the headphone 720. In contrast, in FIG. 8B the linear-travel mechanical switch 700 has been actuated through a linear movement downward relative to the headphone 720. In at least one embodiment, the linear-travel mechanical switch 700 is physically biased to rest in the middle of travel pathway 800 such that once the linear-travel mechanical switch 700 is released in FIGS. 8A and 8B, the linear-travel mechanical switch 700 will automatically return to the middle of the travel pathway 800 as depicted in FIGS. 7A-7D.

As depicted, in at least one embodiment, the travel pathway 800 comprises a recessed area that encloses the linear-travel mechanical switch 700 along its travel pathway. In additional or alternative embodiments, the travel pathway 800 may not comprise a recess but instead may comprise a protrusion extending from a surface of the headphone 720. Further, in some embodiments, the travel pathway 800 may be flush with the surface of the headphone 720 such that there are no recesses or protrusions.

Figures 9A, 9B:
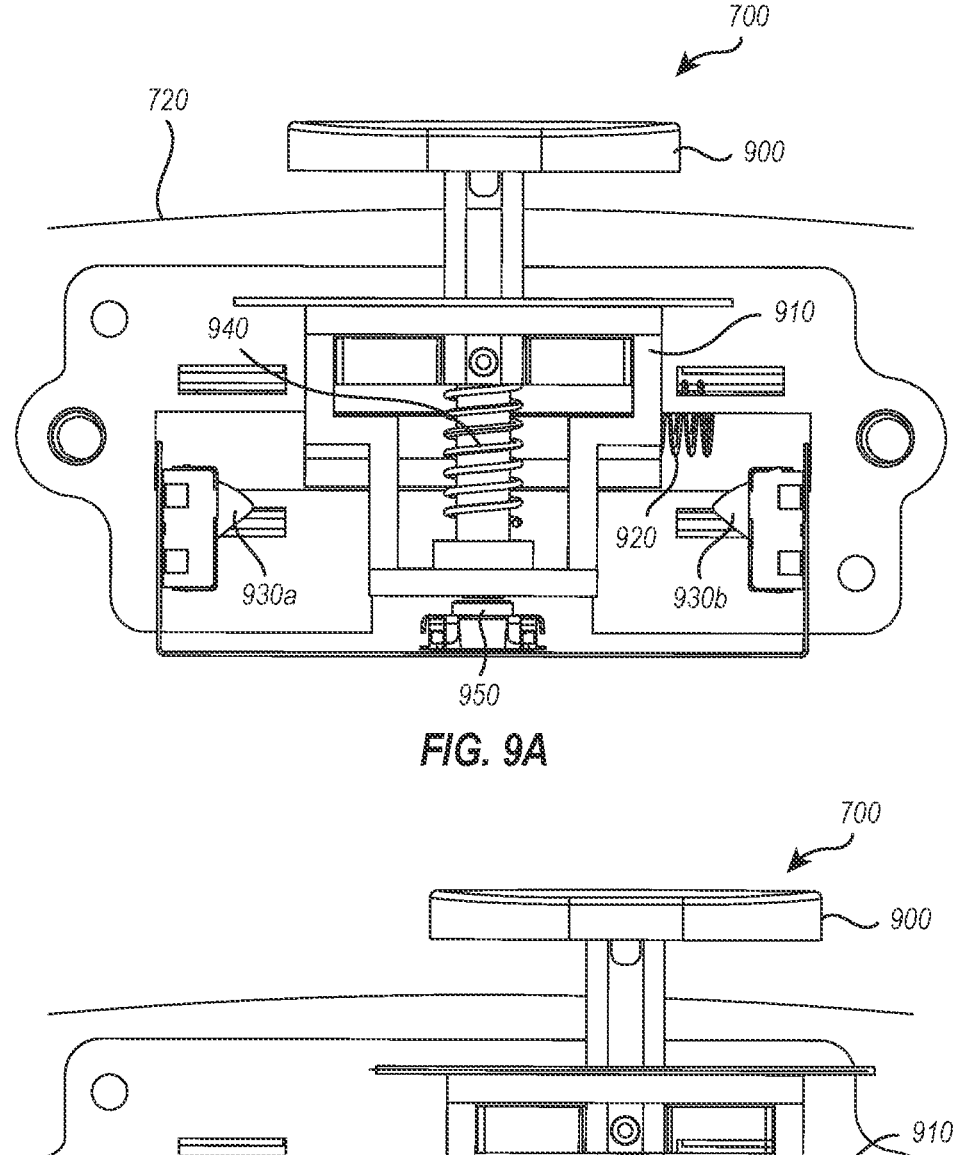
FIG. 9A depicts a cross-section view of a linear-travel mechanical switch.
FIG. 9B depicts a cross-section view of a linear-travel mechanical switch that has been slid to the right relative to FIG. 9B.
Figure 9C:
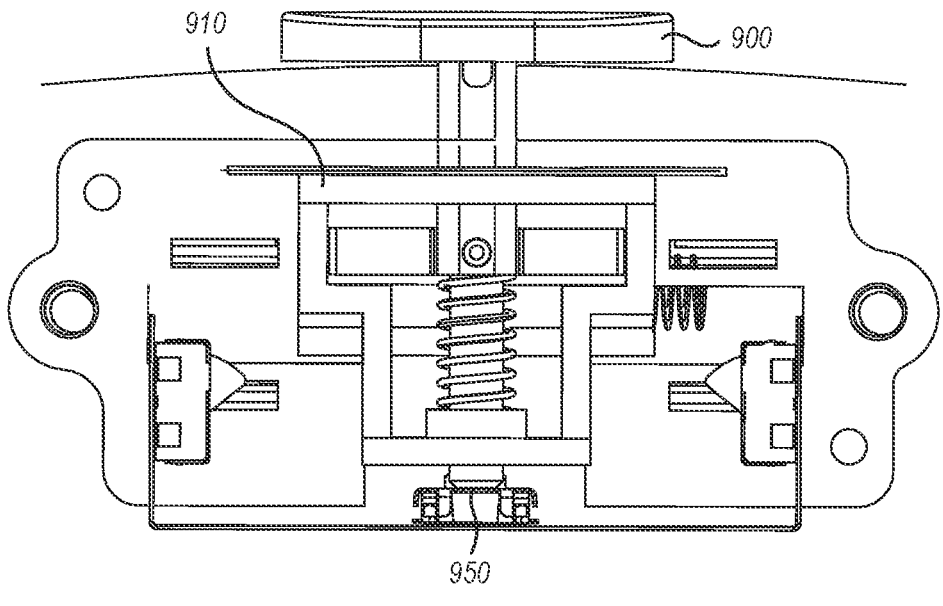
FIG. 9C depicts a cross-section view of a linear-travel mechanical switch that has been depressed.

FIGS. 9A-9C depict a cross sectional view of the components in an embodiment of a linear-travel mechanical switch 700. The depicted linear-travel mechanical switch 700 comprises a user button 900 that extends from the surface of the headphone 720. The user button 900 is coupled to a carriage 910. The carriage 910 may comprise flanges, or some other physical feature, that guide the carriage 910 along its travel path. In the depicted embodiment, the carriage 910 is biased by a carriage spring 920. In various embodiments, a number of different types of biasing devices may be used to bias the user button 900 into a middle, or neutral, position within the travel pathway 800. The user button 900 may be coupled to the carriage 910 through a plunger 940. The plunger 940 may also be biased in an upward position by a plunger spring that exerts an upward force on the user button 900.

In the depicted embodiment, the linear-travel mechanical switch 700 comprises at least three buttons. A plunger button 950 is positioned below the plunger 940. The linear-travel mechanical switch 700 further comprises a left button 930*a* and a right button 930*b*. One will appreciate that the designation of "right" or "left" is made with respect to the figures. Alternatively, they may be referred to as a "first button" and a "second button;" however, for the sake of clarify they will primarily be referred to as a left button 930*a* and a right button 930*b* in this description. This designation is provided only for the sake of simplicity and explanation. In various embodiments, the buttons 930*a*, 930*b* may be otherwise positioned and/or described.

In FIG. 9B the linear-travel mechanical switch 700 has been linearly moved such that the right button 930*b* is engaged. One will appreciate that the linear-travel mechanical switch 700 could also be linearly moved such that the left button 930*a* is engaged. The left button 930*a* and the right button 930*b* may comprise microswitches, rocker switches, push button switches, momentary switches, hall-effect switches, magnetic switches, electric switches, mechanical switches, or any other type of conventional switch. Additionally, the left button 930*a* and the right button 930*b* may be configured to detect multiple different levels and types of inputs. For example, the left button 930*a* and the right button 930*b* may comprise multi-stage switches that are capable of detected multiple levels of force and/or multiple levels of duration.

FIG. 9C depicts the linear-travel mechanical switch 700 where the user button 900 has been depressed such that it depresses the plunger button 950. As used herein, the user button 900 is "depressed" such that it engages the plunger button 950. In at least one embodiment, the plunger button 950 can detect a depression of the user button 900 when the user button 900 is depressed at least 0.7 mm. The plunger button 950 may comprise microswitches, rocker switches, push button switches, momentary switches, hall-effect switches, magnetic switches, electric switches, mechanical switches, or any other type of conventional switch. In at least one embodiment, the plunger button 950 may comprise a silicon dome button. The silicon dome button may provide the plunger button 950 with a desirable soft and haptic response to a user pressing the user button 900. Additionally, the plunger button 950 may be configured to detect multiple different levels and types of inputs. For example, the plunger button 950 may comprise multi-stage switches that are capable of detecting multiple levels of force and/or multiple levels of duration. Additionally, in at least one embodiment, the linear-travel mechanical switch 700 comprises a lock-out function that prevents the user button 900 from being depressed while the linear-travel mechanical switch 700 is in any position other than neutral, or the middle. For example, the carriage 910 may comprise a feature that prevents the user button 900 from being depressed when the carriage is in any position other than neutral.

Figure 10A:
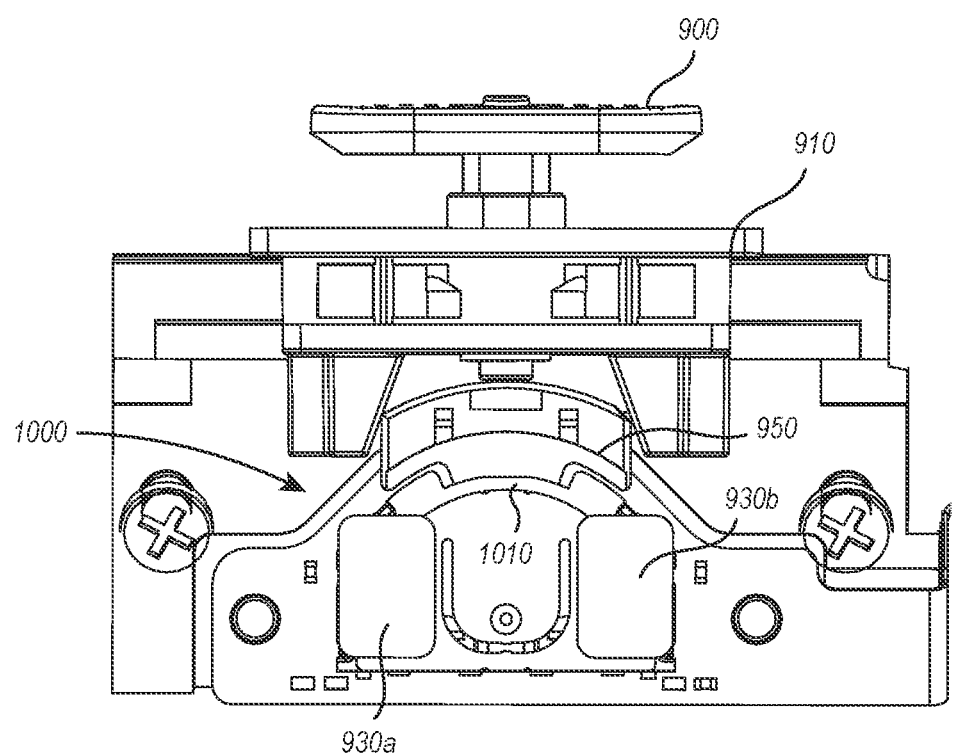
FIG. 10A depicts a cross-section view of a linear-travel mechanical switch.
Figure 10B:
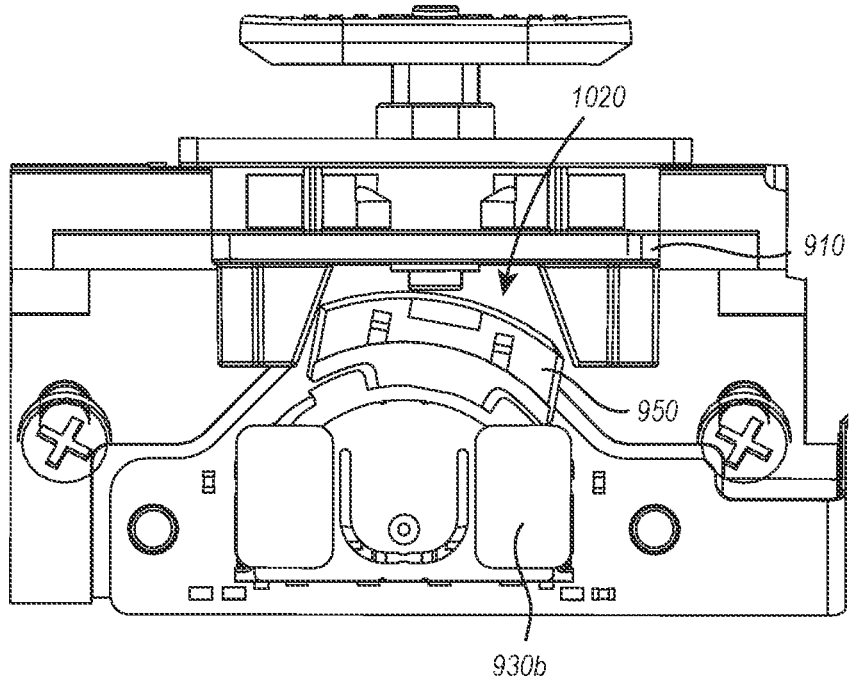
FIG. 10B depicts a cross-section view of a linear-travel mechanical switch that has been slid to the right relative to FIG. 10B.
Figure 10C:
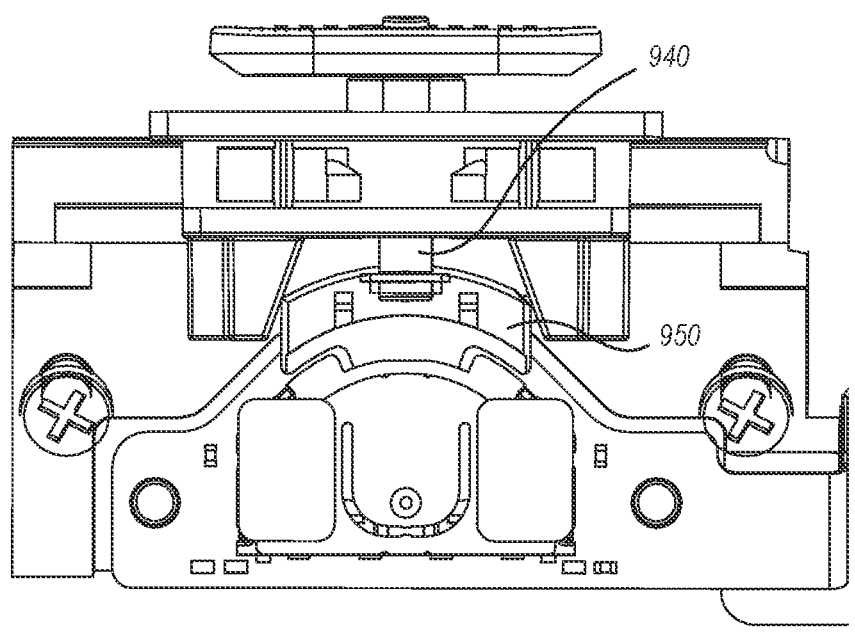
FIG. 10C depicts a cross-section view of a linear-travel mechanical switch that has been depressed.

FIGS. 10A-10C depict another embodiment of a linear-travel mechanical switch 700. In this embodiment, the linear-travel mechanical switch 700 comprises a user button 900, a carriage 910, a plunger button 950, a left button 930*a*, and a right button 930*b*. In contrast to the linear-travel mechanical switch 700 of FIGS. 9A-9C, this embodiment comprises a rotary switch 1000. The rotary switch 1000 comprises the plunger button 950 that rides on a semi-hemispherical surface 1010 that allows for rotary motion when moving the plunger button 950 from left to right relative to the figures. Moving the plunger button 950 rotationally to the left causes the left button 930*a* to activate. Moving the plunger button 950 rotationally to the right causes the right button 930*b* to activate.

FIG. 10B depicts an embodiment of the linear-travel mechanical switch 700 maintaining a substantially or purely linear travel while engaging with the rotary switch 1000 through the use of a cam 1020 that is integrated into the carriage 910. As depicted, the linear-travel mechanical switch 700 has been linearly moved to the right such that the right button 930*b* is now engaged. Moving the linear-travel mechanical switch 700 to the right has caused the plunger button 950 to travel rotationally along the semi-hemispherical surface 1010 to the right as well. However, the presence of the cam 1020 integrated into the carriage 910 has translated the rotational movement of the rotational switch 1000 into a linear movement for the user button 900. One will appreciate that a similar outcome would result if the linear-travel mechanical switch 700 was moved to the left such that the left button 930*a* was engaged. Accordingly, in at least one embodiment, the linear-travel mechanical switch 700 may utilize a rotational switch 1000 and still maintain a purely or substantially linear motion of the user button 900.

In various embodiments, the left button 930*a* and the right button 930*b* may comprise microswitches, rocker switches, push button switches, momentary switches, hall-effect switches, magnetic switches, electric switches, mechanical switches, or any other type of conventional switch. Additionally, the left button 930*a* and the right button 930*b* may be configured to detect multiple different levels and types of inputs. For example, the left button 930*a* and the right button 930*b* may comprise multi-stage switches that are capable of detecting multiple levels of force and/or multiple levels of duration.

FIG. 10C depicts the linear-travel mechanical switch 700 where the user button 900 has been depressed such that it depresses the plunger button 950. In various embodiments, the plunger button 950 may comprise microswitches, rocker switches, push button switches, momentary switches, hall-effect switches, magnetic switches, electric switches, mechanical switches, or any other type of conventional switch. In at least one embodiment, the plunger button 950 may comprise a silicon dome button. The silicon dome button may provide the plunger button 950 with a desirable soft and haptic response to a user pressing the user button 900. Additionally, the plunger button 950 may be configured to detect multiple different levels and types of inputs. For example, the plunger button 950 may comprise a multi-stage switch that is capable of detecting multiple levels of force and/or multiple levels of duration. Additionally, in at least one embodiment, the linear-travel mechanical switch 700 comprises a lock-out function that prevents the user button 900 from being depressed while the linear-travel mechanical switch 700 is in any position other than neutral, or the middle. For example, the carriage 910 or the rotational switch 1000 may comprise a feature that prevents the user button 900 from being depressed when the carriage is in any position other than neutral.

Figure 11A:
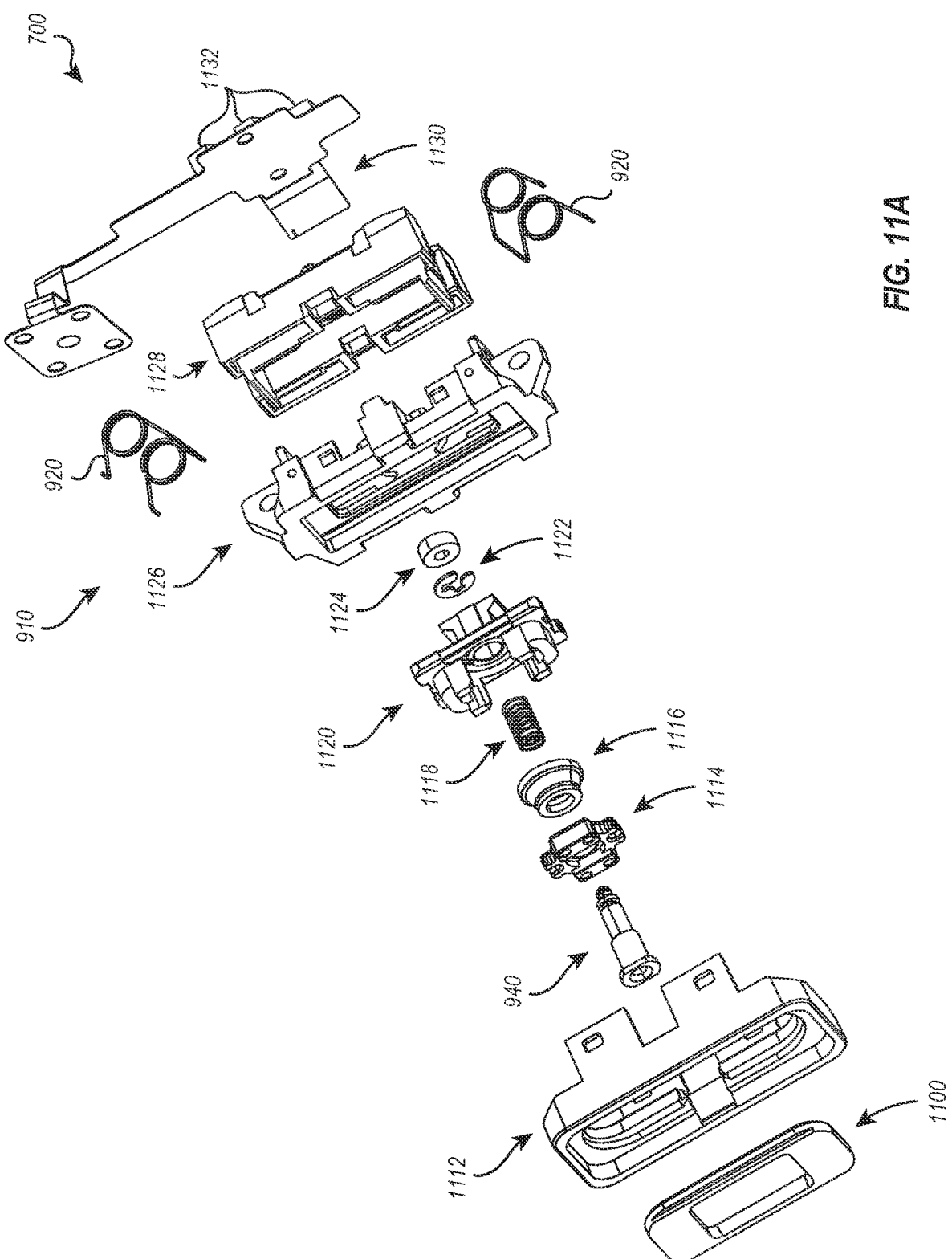
FIG. 11A depicts an exploded view of a linear-travel mechanical switch that includes one or more hall-effect switches.
Figure 11B:
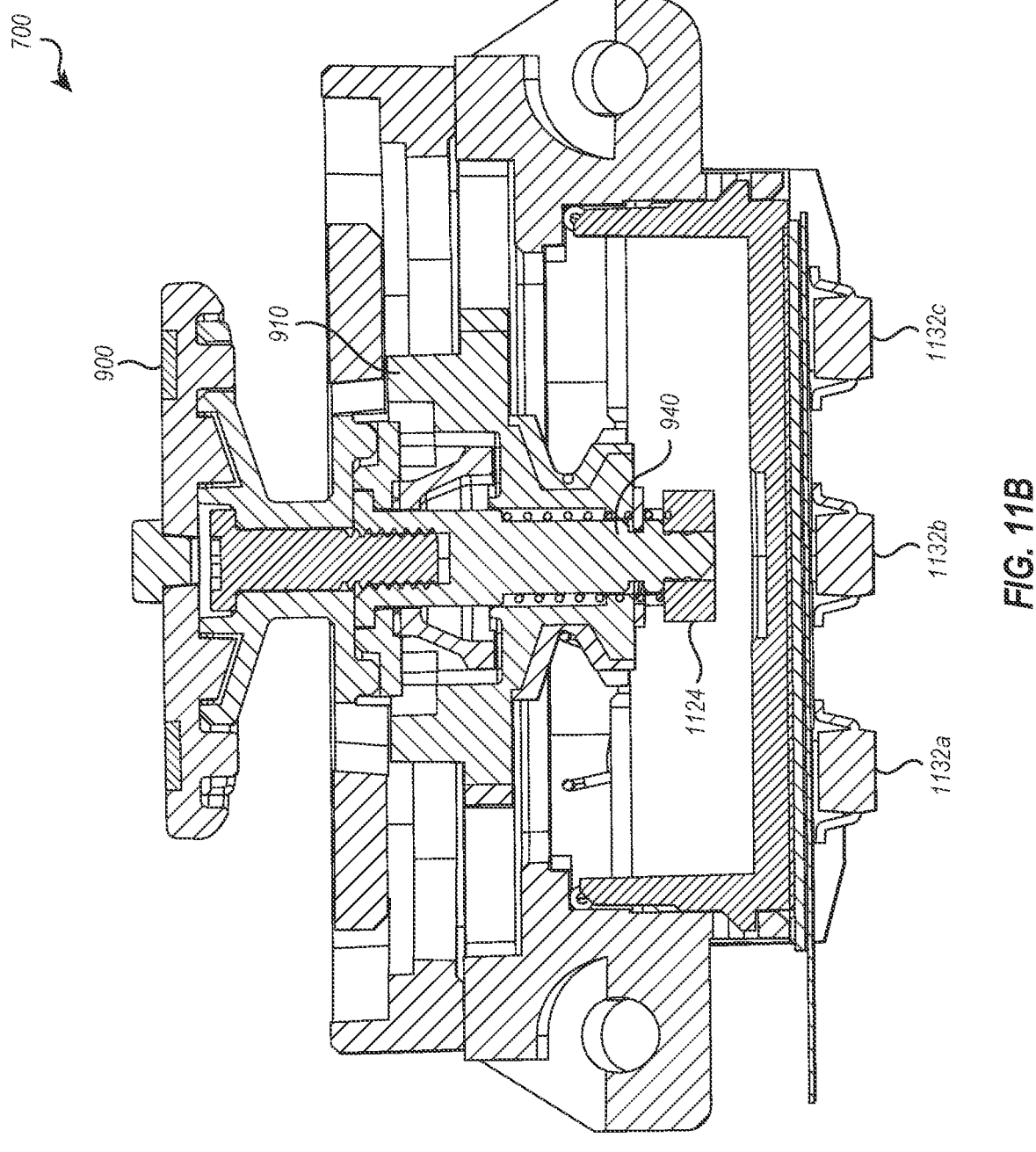
FIG. 11B depicts a cross-section view of a linear-travel mechanical switch that includes one or more hall-effect switches.

FIGS. 11A and 11B depict another embodiment of a linear-travel mechanical switch 700. In particular, FIG. 11A depicts an exploded view of the linear-travel mechanical switch 700 that includes one or more hall-effect switches 1132. Hall-effect switches 1132 are a type of sensor that utilizes the Hall Effect to detect the presence of a magnetic field. These switches operate by outputting a digital signal when they come into contact with a magnetic field. When the magnetic field is removed, the switch returns to its original state. In at least one embodiment, an advantage of hall-effect switches 1132 is their reliability. As solid-state devices, they do not have any moving parts that can wear out or fail over time. They are generally immune to dust, dirt, and moisture, which makes them suitable for use in harsh environments. Additionally, they can operate over a wide temperature range, which further increases their versatility.

The exploded view of the linear-travel mechanical switch 700 depicts embodiments of many of the individual parts that are integrated within the linear-travel mechanical switch 700. For example, the depicted portions include a slot cover 1100 that provides the floor of the travel pathway 800 shown in FIG. 8. The slot cover 1100 may be used to prevent debris from traveling into the headphone 720. Slot base 1112 may be configured to receive the slot cover 1100. The plunger 940 may be configured to pass through both the slot base 1112 and the slot cover 1100 and connect to a user button 900 (not shown).

The linear-travel mechanical switch 700 may also comprise a slider 1114 that comprises flanges for traveling linearly within slot in the headphone 720. A silicon button 1116 may be positioned below the slider 1114. The silicon button 1116 in this embodiment may comprise a dome shape that is meant to provide a desirable soft and haptic response to a user pressing the user button 900. Similarly, a spring 1118 may be positioned below the silicon button 1116 in order to bias the plunger 940 in an upward direction. In at least one embodiment, the silicon button 1116 may also provide a barrier that prevents dirt, moisture, and other debris from entering the headphone 720.

The mechanical switch 700 may further comprise a plunger base 1120. In at least one embodiment, an e-ring 1122 attaches near the bottom of the plunger 940. When attached to the plunger 940, the e-ring 1122 may provide an obstruction to the bottom surface of the plunger base 1120 such that the e-ring 1122 is unable to pass through a hole in the plunger base 1120. Accordingly, the e-ring 1122 in combination with the plunger base 1120 may prevent the plunger 940 from falling out of linear-travel mechanical switch 700.

A magnet 1124 may be affixed to the bottom of the plunger 940. The magnet 1124 may be used to activate one or more hall-effect switches 1132 that are positioned near the bottom 1130 of the linear-travel mechanical switch 700. A two-component carriage 1126, 1128 may be biased by one or more springs 920 into a middle, or neutral, position with respect to the linear-travel mechanical switch 700.

FIG. 11B depicts a cross-section view of the assembled linear-travel mechanical switch 700 of FIG. 11A. The user button 900 may be activated by depressing the user button 900 while in the neutral position, sliding the user button to the right, or sliding the user button to the left. The carriage 910 may be biased by one or more springs 920 into a middle, or neutral, position with respect to the travel pathway 800.

In the depicted embodiment, the magnet 1124 is positioned near the bottom of the plunger 940. The magnet 1124 is used to activate one or more hall-effect switches 1132. As used herein, the hall-effect switches are collectively labeled 1132, while individual switches are labelled 1132a, 1132b, and 1132c. Hall-effect switch 1132a may be equivalent to left button 930a, hall-effect switch 1132c may be equivalent to right button 930b, and hall-effect switch 1132b may be equivalent to plunger button 950.

The position of the magnet 1124 relative to one or more hall-effect switches 1132(a-c) causes various different actions to occur. For example, FIG. 12 illustrates a chart 1200 of various signals received by hall-effect switches 1132(a-c) that are integrated within a linear-travel mechanical switch 700. In this embodiment, the closer the magnet 1124 comes to a hall-effect switch 1132(a-c) the lower the signal produced by the hall-effect switches 1132(a-c). Inversely, as the magnet 1124 moves away from a hall-effect switch 1132(a-c), the output signal increases.

Accordingly, as shown in chart 1200, when the user button 900 is a non-actuated state, or free state, the hall-effect switches 1132(a-c) all produce a relatively higher signal. In contrast, when the user button 900 is depressed, the magnet 1124 will be pushed closer to hall-effect switch 1132b. As such, hall-effect switches 1132a, 1132c will continue to register a relatively higher signal and hall-effect switch 1132b will register a relatively low signal. As shown in the chart, when the user button 900 is slid to the left, hall-effect switches 1132b, 1132c will continue to register a relatively higher signal and hall-effect switch 1132a will register a relatively low signal. In contrast, when the user button 900 is slid to the right, hall-effect switches 1132a,

1132b will continue to register a relatively higher signal and hall-effect switch 1132c will register a relatively low signal.

One of skill in the art will appreciate that the magnitudes of the relative terms "high" and "low" may be dependent upon the particular magnet 1124 and hall-effect switches 1132 being used within the linear-travel mechanical switch 700. For example, some hall-effect switches 1132 operate differently based upon whether a south pole or a north pole of the magnet 1124 is facing the hall-effect switches 1132. Additionally, different hall-effect switches 1132 may comprise different output signals and/or may be connected to different amplifiers that amplify their output signals. Additionally, one of skill in the art will appreciate that in some configurations, a hall-effect switch 1132 will generate a high signal when the magnet 1124 is close to the hall-effect switch 1132 and a low signal when the magnet 1124 is further away from the hall-effect switch 1132. One of skill in the art will be readily able to account for the difference in hall-effect switches 1132 and magnets 1124 when determining a position of the user button 900.

Additionally, in at least one embodiment, the hall-effect switches 1132 may provide continuous tracking of the magnet 1124 along the entire travel path 800. For example, when moving left, in accordance with table 1200, the relative differences between hall-effect switch 1132a and hall effect switches 1132b and 1132c may gradually change. The speed of change may provide information for the force and/or speed at which a user is sliding the user button 900. Additionally, the relative difference between hall-effect switch 1132a and hall effect switches 1132b and 1132c may indicate whether a user has moved the user button 900 along the entire travel path 800 or if the user has only slid the user button 900 a portion of the way along the travel path 800.

In various embodiments, the linear-travel mechanical switch 700 comprises particular features and characteristics that define the user interface experience. For example, when sliding the user button 900 left or right (relative to the figures) and then releasing the user button 900, the user button 900 depth relative to the travel pathway 800 may remain substantially consistent, or wholly consistent, throughout the travel pathway 800. While a user is pushing the user button 900 along the travel pathway 800 and after release when the user button 900 is automatically returning to a neutral position, any resultant sound may be subtle and low frequency. Additionally, the resistance of the movement is sufficient to avoid accidently triggering.

Additionally, when a user presses the user button 900 downward (towards the plunger button 950), the top of the user button 900 may become flush with an upper edge of the travel pathway 800. In at least one embodiment, the downward travel of the user button 900 is equal to a thickness of the user button 900. Further, in at least one embodiment, the top of the user button 900 does not sink below the upper edge of the travel pathway 800. Any resulting sound from depressing the user button downward may be a subtle and low frequency sound. In at least one embodiment, the plunger button 950 provides user feedback that is roughly equivalent to a 40%-60% snap ratio of a silicon dome button.

IV. Example Headphone Playback Devices and Software User Interfaces

In at least one embodiment, the linear-travel mechanical switch 700 is electrically connected to one or more processors within the headphone 720. The linear-travel mechanical switch 700 may be connected to the processors through a flexible cable, a wire connection, a direct solder to the processors, or through any other conventional means for electrical connection. The linear-travel mechanical switch 700 is able to send communications to the processors for processing. One of skill in the art will appreciate the innovation involved in linking particular actions and commands to specific user interface interactions. The embodiments disclosed herein provide examples of actions and commands that can be activated through the use of particular movements of the linear-travel mechanical switch 700. In at least one embodiment, the actions and commands may also be impacted by the speed of movements, force of movements, and partial movements of the linear-travel mechanical switch 700.

For example, in at least one embodiment, the linear-travel mechanical switch 700 is configured to play/pause playback audio when the user button 900 is depressed and then released. Additionally, when the user button 900 is pressed and released twice in quick succession, the one or more processors cause the playback audio to skip to the next playback audio content. In contrast, when the user button 900 is pressed and released three times in quick succession, the one or more processors cause the playback audio to skip to the previous playback audio content. One will appreciate that the above described associations between particular button presses and resulting commands are only provided for the sake of example and explanation. In practice a variety of different button press sequences, durations, and/or forces may result in a variety of different resulting commands. For example, as described further below, the commands that result from different button presses may be dependent upon the status of the headphone 720 (e.g., donned or doffed). Similarly, the particular button presses may change based upon a variety of different factors, such as the state of a control device 130.

In at least one embodiment, when the user button 900 is slid up (relative to the headphone 720) and held for a predetermined period of time, the one or more processors cause the volume to increase. Similarly, when the user button 900 is slid down (relative to the headphone 720) and held for a predetermined period of time, the one or more processors cause the volume to decrease. In at least one embodiment, the volume can be increased or decreased based upon the current volume of the headphone 720. For example, if the volume is currently less than 16% of its max, the volume can be changed by increments of 2%. In contrast, if the volume is greater than 16% of its max, the volume can be changed by increments of 4%. Additionally, if a user holds the user button 900 in a slid up or slid down position for more than about 340 ms, the volume may increase at 2% faster for every 340 ms that the user button 900 is held in at an up or down position. In at least one embodiment, the rate at which the volume is increased or decreased can also be controlled by a user making partial and/or slow movements of the user button 900. For example, moving the user button 900 halfway along the travel path 800 may cause the volume to change at half the rate than if the user button 900 had been moved along the entire travel path 800.

In at least one embodiment, the sliding the user button 900 up or down (relative to the headphone 720) can provide a number of different functions. For example, sliding the user button 900 in a particular direction may skip playback content or play the previous playback content. Additionally or alternatively, sliding the user button 900 in a particular direction may seek within a track or jump forwards or backwards a set amount of time within the playback content.

Accordingly, sliding the user button 900 in a particular direction may be associated with a number of different functions and actions.

Additionally, in at least one embodiment, a user may be able to receive phone calls through the headphone 720. In such a configuration, when a call is received the music may automatically be paused and a phone ring may be played through the headphone 720. When the user button 900 is depressed and released, the headphone 720 may answer the call. When the user is done with the call, depressing and releasing the user button 900 causes the call to end. In contrast, when the user may also be able to depress the user button 900 for a predefined amount of time to cause the call to be declined. Once a call is ended or declined, the headphone 720 may automatically begin to play the audio playback content.

In at least one additional or alternative embodiment, the headphone 720 may also be configured to participate in a push or pull command as described in U.S. Pat. No. 11,188,294 entitled "DETECTING THE NEAREST PLAYBACK DEVICE" filed on Aug. 31, 2020, which contents are hereby incorporated in their entirety. The linear-travel mechanical switch 700 may be used to actuate one of more push or pull commands, such as a theater swap mode. For example, in at least one embodiment, a user may be listening to audio playback through the headphone 720. By depressing the user button 900 for a threshold amount of time, the user may be able to push the audio playback on the headphone 720 to another playback device 110 within their general vicinity.

In various embodiments, the headphone 720 may comprise additional buttons 730 that also provide an end user with a user interface 313. The additional buttons 730 may be positioned on just a single earcup or may be located on both earcups. In at least one embodiment, the additional buttons 730 and the linear-travel mechanical switch 700 may have different functions that depend upon whether the headphone 720 is donned or doffed. In at least one embodiment, a user is able to deactivate that ability of the headphone 720 to detect whether the headphone 720 is donned or doffed. In such a case, the headphone 720 may interpret inputs as if the headphone 720 is being worn. Further, the additional buttons 730 and the linear-travel mechanical switch 700 may have different functions that depend upon a state that the headphone 720 is in.

In at least one embodiment, the following actions can be performed whether the headphone 720 is donned or doffed. While the headphone 720 is in a powered down or sleep state, the headphone 720 may be powered on by pressing and releasing a power button. In at least one embodiment, the power button is located on the earcup opposite the earcup with the linear-travel mechanical switch 700. The power button may comprise the same appearance as additional button 730. Additionally, when in an active or idle mode, the headphone may be powered down by pressing and releasing the power button. Further, in at least one embodiment, the headphone 720 may be placed in a BLUETOOTH pairing mode by pressing and holding the power button for a threshold amount of time.

In at least one embodiment, the following actions can only be performed when the headphone 720 is detected as being donned. While the headphone is in an active or idle state, the user can activate a voice assistant by pressing and holding the additional button for a threshold amount of time. Similarly, when the headphone is in an active or idle state, the end user may be able to generate an audio battery readout by double pressing and releasing the power button.

In at least one embodiment, the following actions can only be performed when the headphone 720 is detected as being donned and while the headphone is in an idle state. For example, a user may be able to play playback content by depressing and releasing the user button 900 on the linear-travel mechanical switch 700. Additionally, by depressing the user button 900 for a threshold amount of time, the user may be able to push the audio playback on the headphone 720 to another playback device 110 within their general vicinity. In addition, a user may be able to skip playback content by depressing and releasing the user button 900 twice in short succession. Further, a user may be able to play previous playback content by depressing and releasing the user button 900 three times in short succession.

In at least one embodiment, the following actions can only be performed when the headphone 720 is detected as being donned and while the headphone is in an active state. For example, a user may depress the user button 900 for a threshold amount of time to stop or cancel the pushing of audio content to another playback device. The user may also pause the playback of audio content by pressing and releasing the user button 900. Similar to the behavior of the headphone 720 when in idle mode, a user may be able to skip playback content by depressing and releasing the user button 900 twice in short succession, and a user may be able to play previous playback content by depressing and releasing the user button 900 three times in short succession. Additionally, the user may be able to increase the volume on the headphone 720 by sliding and releasing the linear-travel mechanical switch 700 upward relative to the headphone 720. Similarly, the user may be able to decrease the volume on the headphone 720 by sliding and releasing the linear-travel mechanical switch 700 downward relative to the headphone 720. The user may also be able to ramp-up or ramp-down the volume at a faster rate by sliding the linear-travel mechanical switch 700 upward or downward and holding the slider in its relative location for a threshold amount of time.

In at least one embodiment, the following actions can only be performed when the headphone 720 is detected as being donned and while the headphone is in an active phone call state. The active phone call state occurs when a user is currently participating in a phone call through the headphone 720. The user may be able to end the call by pressing the user button 900 for a threshold amount of time. The user may also be able to increase the volume of the call by sliding and releasing the linear-travel mechanical switch 700 upward relative to the headphone 720. Similarly, the user may be able to decrease the volume of the call by sliding and releasing the linear-travel mechanical switch 700 downward relative to the headphone 720. The user may also be able to ramp-up or ramp-down the volume of the call at a faster rate by sliding the linear-travel mechanical switch 700 upward or downward and holding the slider in its relative location for a threshold amount of time. Additionally, in at least one embodiment the user may be able to toggle a noise-cancellation feature on or off by pressing a noise cancellation button (e.g., additional button 730).

In at least one embodiment, the following actions can only be performed when the headphone 720 is detected as being donned and while the headphone is receiving a phone call. The user can answer the incoming phone call by pressing and releasing the user button 900. Additionally, the user can decline the incoming phone call by pressing the user button 900 for a threshold amount of time.

In at least one embodiment, the following actions can only be performed when the headphone 720 is detected as being donned and while the headphone is in a voice assistant state. A voice assistant state occurs when a voice assistant has been activated and is waiting for a command from the user or providing a response to the user. In at least one embodiment, the user can interrupt a voice assistant response by pressing and releasing the additional button 730. The user can also start a new voice assistant query by pressing the additional button 730 for a threshold amount of time.

In at least one embodiment, when the headphone 720 is detected as doffed and connected to an external power supply, a user can perform a factory reset on the headphone 720 by pressing and holding the power button for a threshold amount of time.

One of skill in the art will appreciate that the particular association of commands with specific interactions of buttons and switches may define the user interface 313. Further, the coherence and consistency of such innovation can provide significant benefits to end users who are seeking intuitive experiences when interacting with electronic devices, such as headphones 730. While modern electronic devices are providing increasing complex functionality and features, end users are expecting simple and intuitive interactions with the devices that require little, if any, instruction.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods. For example, a head mounted display may comprise a linear-travel mechanical switch.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A linear-travel mechanical switch for use in a headphone device comprising:
    a user button attached to a plunger, wherein the plunger extends into a body of the headphone device;
    a travel pathway extending a first linear direction from the plunger and in a second, opposite linear direction from the plunger;
    at least one bias device integrated into the linear-travel mechanical switch, the at least one bias device biasing the plunger to a middle position along the travel pathway;
    a plunger button located such that depressing the user button engages the plunger button;
    a first button located such that a movement of the user button along the travel pathway in the first linear direction engages the first button; and
    a second button located such that a movement of the user button long the travel pathway in the second, opposite linear direction engages the second button.

2. The linear-travel mechanical switch of claim 1, wherein the travel pathway extends at least 2 mm in the first linear direction and at least 2 mm in the second, opposite linear direction.

3. The linear-travel mechanical switch of claim 1, wherein the linear-travel mechanical switch is configured to travel linearly along the travel pathway while remaining in a single plane that is perpendicular to the direction of travel.

4. The linear-travel mechanical switch of claim 1, wherein at least one of the first button, the second button, or the plunger button comprises a hall-effect switch.

5. The linear-travel mechanical switch of claim 1, wherein the at least one bias device comprises a spring.

6. The linear-travel mechanical switch of claim 1, wherein the first button and the second button are configured to control volume of audio output from the headphone device.

7. The linear-travel mechanical switch of claim 1, further comprising a silicon dome button coupled to the user button, wherein the silicon dome button provides user feedback through the user button that comprises a 40%-60% snap ratio of the silicon dome button.

8. The linear-travel mechanical switch of claim 1, wherein the plunger button is configured to detect a depression of the user button when the user button is depressed at least 0.7 mm.

9. The linear-travel mechanical switch of claim 1, wherein the plunger button is configured to control playback of audio output from the headphone device.

10. The linear-travel mechanical switch of claim 1, wherein the first button and the second button are configured to control volume of the headphone device.

11. A headphone device comprising:
    a first earcup;
    a second earcup;
    a headband connected the first earcup and the second earcup; and
    a linear-travel mechanical switch integrated into a surface of the headphone device, wherein the linear-travel mechanical switch comprises:
        a user button attached to a plunger, wherein the plunger extends into a body of the headphone device,
        a travel pathway extending a first linear direction from the plunger and in a second, opposite linear direction from the plunger,
        a plunger button located such that depressing the user button engages the plunger button, and
        wherein the linear-travel mechanical switch is configured to travel linearly along the travel pathway while remaining in a single plane that is perpendicular to the direction of travel.

12. The headphone device of claim 11, wherein the travel pathway extends at least 2 mm in the first linear direction and at least 2 mm in the second, opposite linear direction.

13. The headphone device of claim 11, further comprising a silicon dome button coupled to the user button, wherein the silicon dome button provides user feedback through the user button that comprises a 40%-60% snap ratio of the silicon dome button.

14. The headphone device of claim 11, wherein the plunger button is configured to detect a depression of the user button when the user button is depressed at least 0.7 mm.

15. The headphone device of claim 11, wherein the plunger button is configured to control playback of audio output from the headphone device.

16. The headphone device of claim 11, wherein the linear-travel mechanical switch is configured to control volume of the headphone device.

17. The headphone device of claim 11, wherein the linear-travel mechanical switch is integrated into a surface of the headband.

18. The headphone device of claim 11, wherein the linear-travel mechanical switch is integrated into a surface of the first earcup.

19. The headphone device of claim 18, wherein the linear-travel mechanical switch is located on an outer face of the first earcup.

20. The headphone device of claim 18, wherein the linear-travel mechanical switch is located on a back side of the first earcup.

* * * * *